(12) United States Patent
Watanabe et al.

(10) Patent No.: US 12,228,894 B2
(45) Date of Patent: Feb. 18, 2025

(54) SMART WINDOW CONTROL DEVICE, SMART WINDOW CONTROL METHOD, AND SMART WINDOW CONTROL PROGRAM

(71) Applicant: Nitto Denko Corporation, Ibaraki (JP)

(72) Inventors: Kenta Watanabe, Osaka (JP); Akiko Ogasawara, Osaka (JP); Atsushi Kishi, Osaka (JP)

(73) Assignee: NITTO DENKO CORPORATION, Ibaraki (JP)

(*) Notice: Subject to any disclaimer, the term of this patent is extended or adjusted under 35 U.S.C. 154(b) by 205 days.

(21) Appl. No.: 17/428,116

(22) PCT Filed: Feb. 5, 2020

(86) PCT No.: PCT/JP2020/004434
§ 371 (c)(1),
(2) Date: Aug. 3, 2021

(87) PCT Pub. No.: WO2020/162514
PCT Pub. Date: Aug. 13, 2020

(65) Prior Publication Data
US 2022/0057761 A1     Feb. 24, 2022

(30) Foreign Application Priority Data

Feb. 8, 2019 (JP) ................................ 2019-021863
Jan. 30, 2020 (JP) ................................ 2020-013263

(51) Int. Cl.
G05B 13/04    (2006.01)
E06B 9/24     (2006.01)
(Continued)

(52) U.S. Cl.
CPC .............. *G05B 13/048* (2013.01); *E06B 9/24* (2013.01); *F24F 11/64* (2018.01); *G02F 1/0121* (2013.01); *E06B 2009/2464* (2013.01)

(58) Field of Classification Search
CPC . G05B 13/048; G05B 2219/2628; E06B 9/24; E06B 2009/2417; E06B 2009/2464;
(Continued)

(56) References Cited

U.S. PATENT DOCUMENTS

2012/0239209 A1  9/2012  Brown et al.
2014/0236323 A1  8/2014  Brown et al.
(Continued)

FOREIGN PATENT DOCUMENTS

CN    102707703 A    10/2012
CN    103547965 A    1/2014
(Continued)

OTHER PUBLICATIONS

International Search Report dated Mar. 24, 2020, issued in counterpart International Application No. PCT/JP2020/004434, w/English Translation. (5 pages).
(Continued)

*Primary Examiner* — Tameem D Siddiquee
(74) *Attorney, Agent, or Firm* — WHDA, LLP

(57) ABSTRACT

A smart window control device controls transmittance of a smart window provided as a window of a space where a temperature is controlled by an air conditioning system in accordance with a set temperature. The smart window control device includes a processor, and a memory storing program instructions that cause the processor to obtain a predicted value of external environment information about outside of the space in an interval between a first time and a second time, the second time being when a predetermined time period has elapsed from the first time, calculate tran-
(Continued)

sition of the temperature of the space in the interval based on the predicted value of the external environment information in the interval, and control the transmittance of the smart window so that the temperature of the space in the interval transitions based on the calculated transition of the temperature.

13 Claims, 21 Drawing Sheets

(51) Int. Cl.
*F24F 11/64* (2018.01)
*G02F 1/01* (2006.01)

(58) Field of Classification Search
CPC ..... E06B 3/6722; F24F 11/64; F24F 2110/10; F24F 2110/12; F24F 11/62; F24F 2130/20; G02F 1/0121; G02F 1/13306; G02F 1/163
See application file for complete search history.

(56) References Cited

U.S. PATENT DOCUMENTS

| | | |
|---|---|---|
| 2014/0300945 A1 | 10/2014 | Parker |
| 2015/0109653 A1 | 4/2015 | Greer et al. |
| 2015/0219356 A1 | 8/2015 | Ito et al. |
| 2016/0047958 A1 | 2/2016 | Fujisawa et al. |
| 2018/0073775 A1 | 3/2018 | Cascia |
| 2018/0143501 A1 | 5/2018 | Nagel et al. |
| 2018/0181085 A1* | 6/2018 | Gabriel ................ G05B 13/042 |
| 2018/0195340 A1 | 7/2018 | Satoh et al. |
| 2019/0011146 A1* | 1/2019 | Seo ........................... F24F 11/64 |
| 2019/0178525 A1* | 6/2019 | Urakawa ................. F24F 3/044 |
| 2019/0234638 A1* | 8/2019 | Song ........................ F24F 11/62 |
| 2019/0263231 A1* | 8/2019 | Jabour .................. B60R 16/037 |

FOREIGN PATENT DOCUMENTS

| | | |
|---|---|---|
| CN | 203478500 U | 3/2014 |
| CN | 104097362 A | 10/2014 |
| CN | 106461251 A | 2/2017 |
| CN | 106930675 A | 7/2017 |
| CN | 107735543 A | 2/2018 |
| JP | H07-127897 A | 5/1995 |
| JP | 2003-13677 A | 1/2003 |
| JP | 2007-277833 A | 10/2007 |
| JP | 2015-534127 A | 11/2015 |
| JP | 2016-89588 A | 5/2016 |
| JP | 2019-000081 A | 1/2019 |

OTHER PUBLICATIONS

Office Action dated Jan. 12, 2023, issued in counterpart to CN Application No. 202080012572.5, with English Translation. (16 pages).

Office Action dated Jul. 21, 2022, issued in counterpart CN application No. 202080012572.5, with English machine translation. (10 pages).

The Extended European Search Report Feb. 28, 2022, issued in counterpart EP application No. 20753259.9. (7 pages).

* cited by examiner

FIG.10
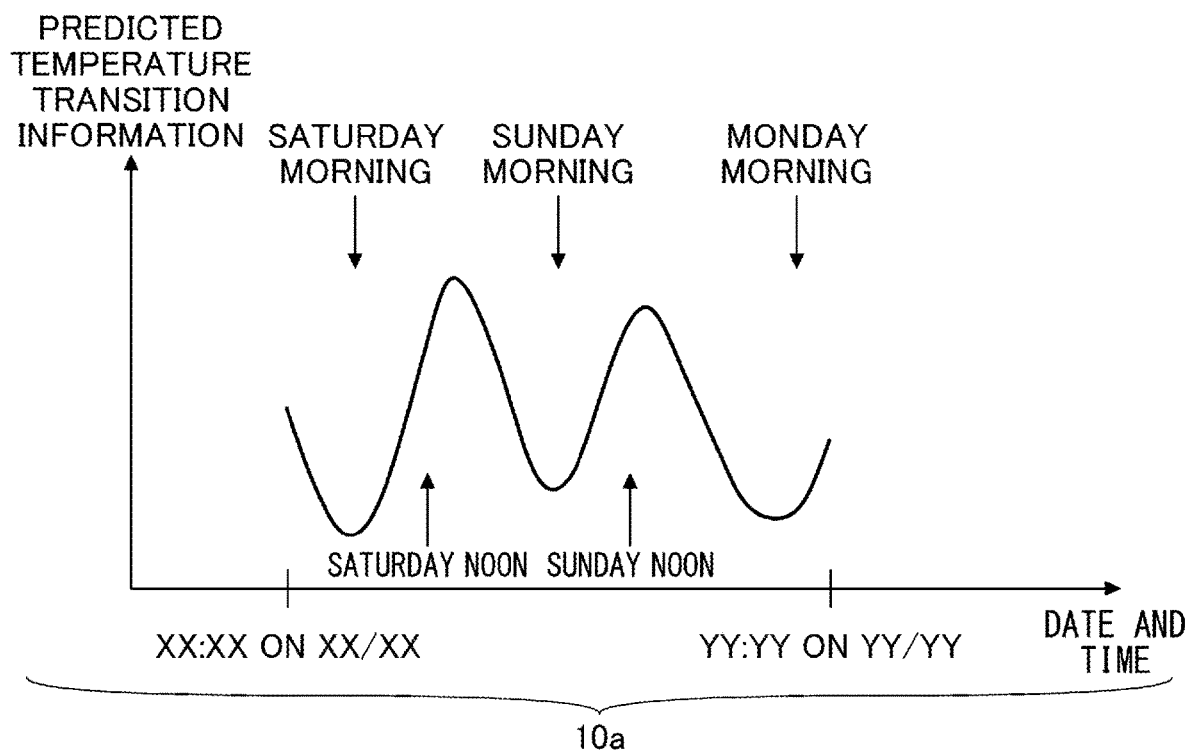
10a
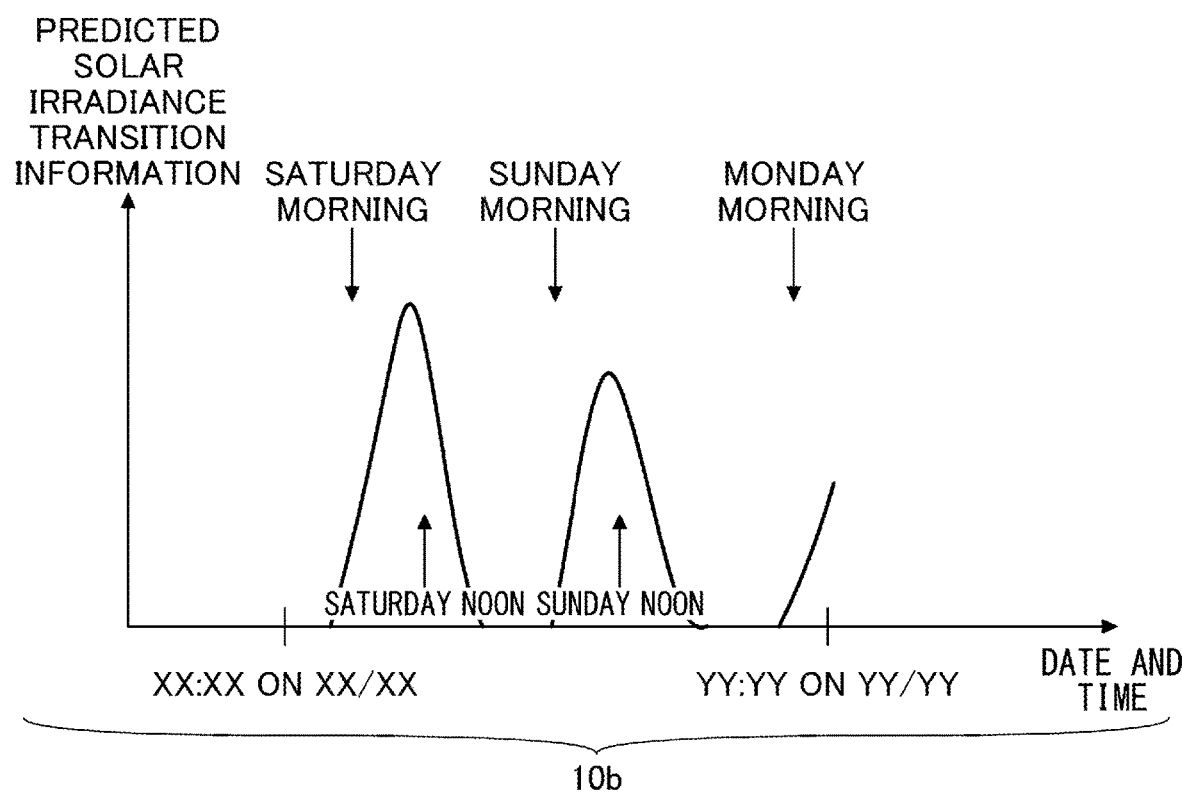
10b

SMART WINDOW CONTROL DEVICE, SMART WINDOW CONTROL METHOD, AND SMART WINDOW CONTROL PROGRAM

TECHNICAL FIELD

The present invention relates to a smart window control device, a smart window control method, and a smart window control program.

BACKGROUND ART

A conventional smart window control system that applies a glass that can control optical properties (e.g., transmittance) to a window of a building such as an office building, as a smart window, to adjust the amount of sunlight entering the building and the amount of heat, is known.

According to the smart window control system, for example, in summer, the amount of sunlight entering a building and the amount of heat can be reduced, and in winter, the amount of sunlight entering a building and the amount of heat can be increased, thereby assisting the air conditioning system that controls the temperature inside the building. As a result, this reduces the load on the air conditioning system.

RELATED ART DOCUMENTS

Patent Document

[Patent Document 1] Japanese Translation of PCT International Application Publication No. 2015-534127

SUMMARY OF THE INVENTION

Problem to be Solved by the Invention

Here, in the smart window control system, a time lag between the control of the transmittance to adjust the amount of sunlight entering the building and the amount of heat, and the actual change of the temperature inside the building is great.

Therefore, in order to reduce the load on the air conditioning system, the time lag described above must be considered when controlling the transmittance.

In one aspect, it is an object to reduce the load on the air conditioning system.

Means for Solving the Problem

According to an embodiment, a smart window control device controls transmittance of a smart window provided as a window of a space where a temperature is controlled by an air conditioning system in accordance with a set temperature. The smart window control device includes an obtaining unit configured to obtain a predicted value of external environment information about outside of the space in an interval between first time and second time, the second time being when a predetermined time period has elapsed from the first time, a calculating unit configured to calculate transition of the temperature of the space in the interval based on the predicted value of the external environment information in the interval, and a transmittance control unit configured to control the transmittance of the smart window so that the temperature of the space in the interval transitions based on the calculated transition of the temperature.

Advantageous Effect of the Present Invention

The load on the air conditioning system can be reduced.

BRIEF DESCRIPTION OF THE DRAWINGS

FIG. 10 is of graphs illustrating a specific example of a predicted value of environment information in a prediction mode interval;

EMBODIMENTS FOR CARRYING OUT THE INVENTION

In the following, embodiments will be described with reference to the accompanying drawings. In the present specification and the drawings, components having substan-

First Embodiment

<Appearance Configuration>

Figure 1:
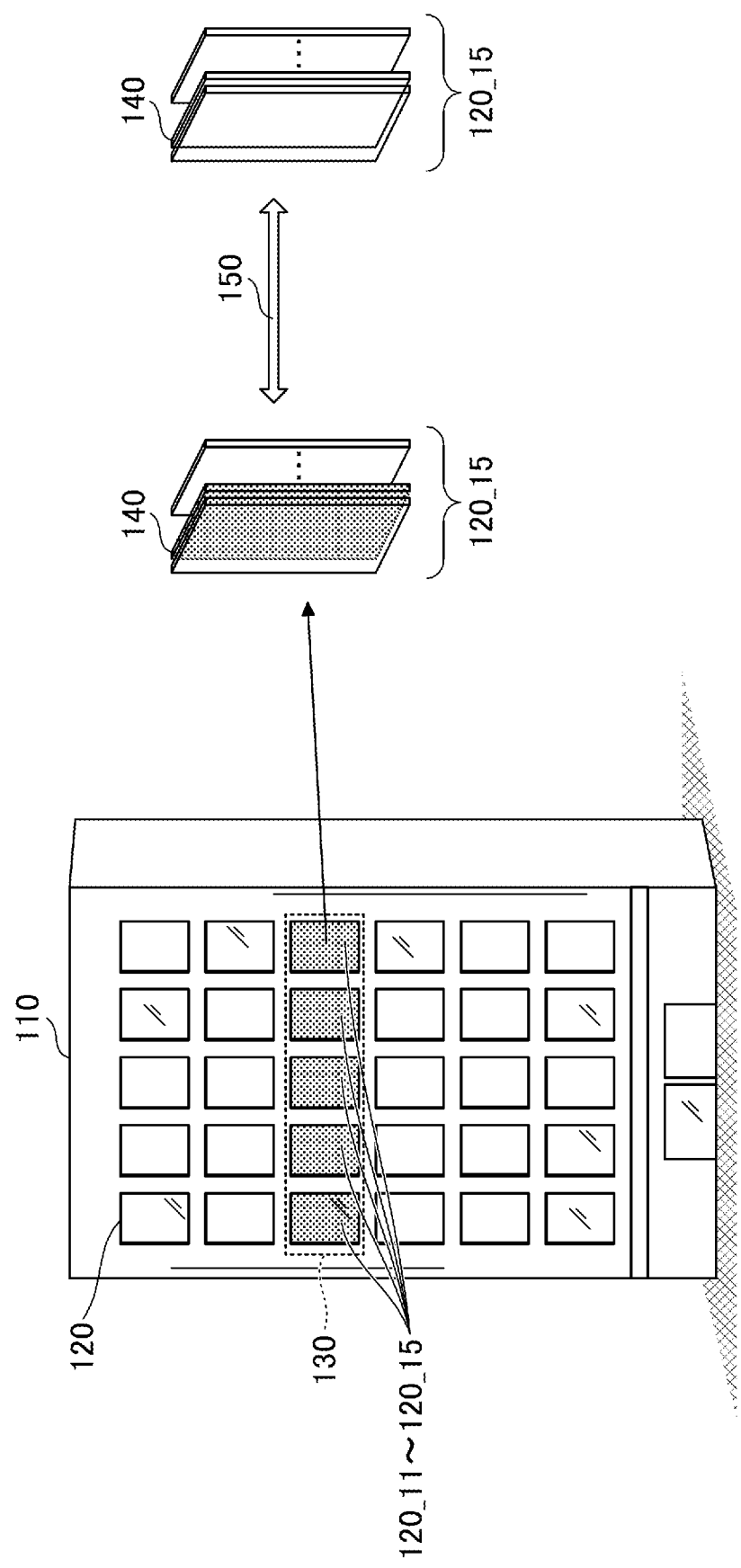
FIG. 1 is a drawing illustrating an appearance configuration of a building where a smart window is installed.

First, an appearance configuration of a building where a smart window is installed will be described. FIG. 1 is a drawing illustrating the appearance configuration of the building where the smart window is installed. As illustrated in FIG. 1, a window group 120 is provided on a predetermined surface of a building 110 (e.g., an office building). In the present embodiment, in the window group 120, smart windows 120_11 to 120_15 are installed on a floor indicated by the dotted line 130.

The smart window is a window to which glass, in which transmittance can be controlled, is applied. In the present embodiment, a method of controlling the transmittance of the glass applied to the smart window may be an electro-chromic method, a polymer dispersed liquid crystal (PDLL) method, or a gas-chromic method.

A cross-sectional configuration of the smart window 120_15 is illustrated on the right side of FIG. 1 and includes multiple layers of glass. In the smart window 120_15, the transmittance of the glass 140 applied to one of the layers is controlled. As illustrated on the right of FIG. 1, the transmittance of the glass 140 is controlled in a range indicated by the arrow 150 (e.g., in a range of 10% to 90%). Thus, the amount of sunlight entering a space of the floor indicated by the dotted line 130 of the building 110 and the amount of heat can be adjusted.

<Configuration of a Network System>

Figure 2:
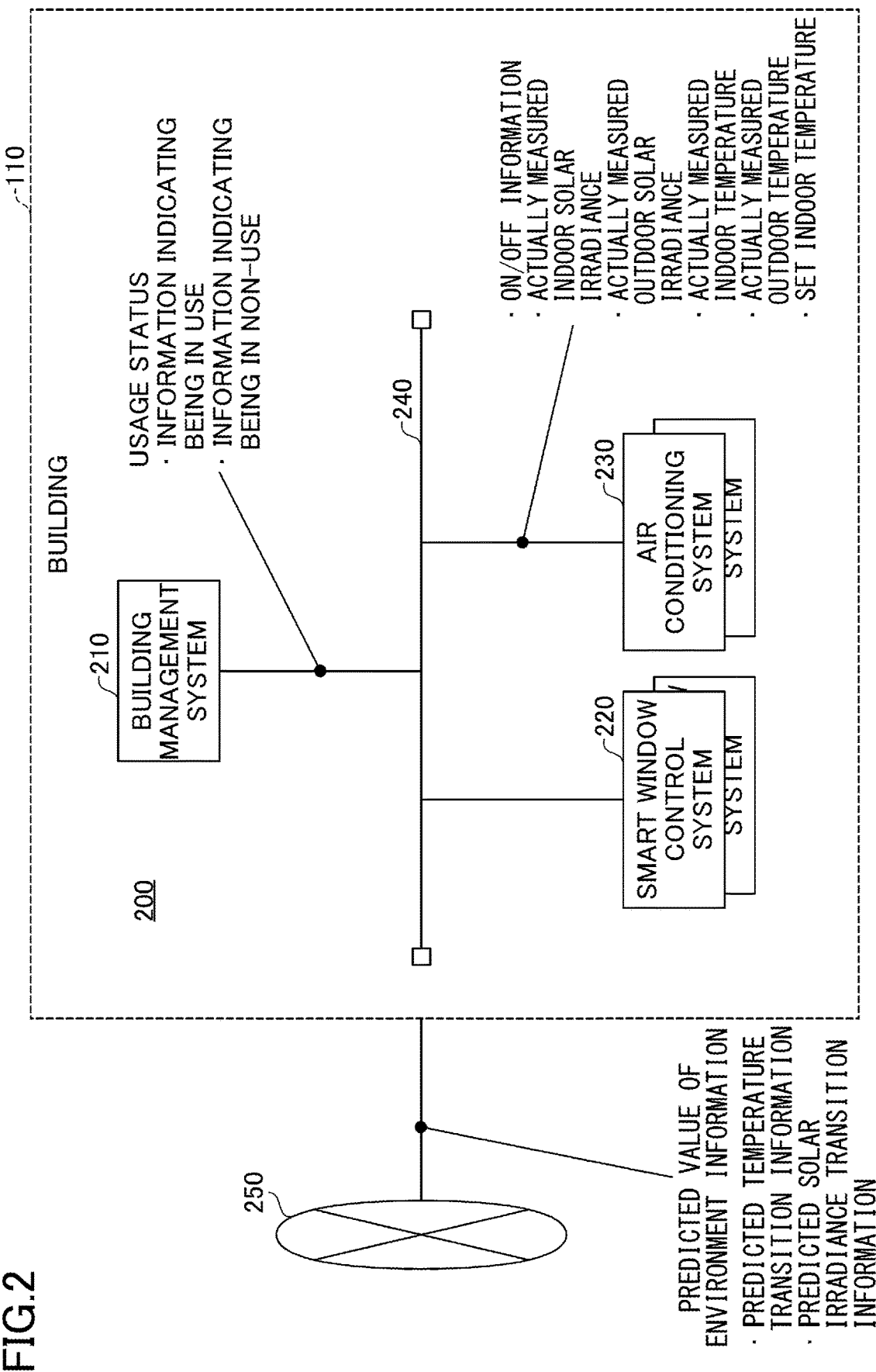
FIG. 2 is a diagram illustrating an example of a network system configured within a building.

Next, a network system configured within the building 110 will be described. FIG. 2 is a diagram illustrating an example of the network system configured within the building. As illustrated in FIG. 2, the network system 200 includes a building management system 210, a smart window control system 220, and an air conditioning system 230. In the network system 200, each system is communicatively connected through a local area network (LAN) 240.

The building management system 210 is a system that manages security within the building 110. In the present embodiment, the building management system 210, for example, monitors whether an entrance of each space on each floor is locked and determines a usage status of each space on each floor.

A method of determining the usage state of each space of each floor that is performed by the building management system 210 is not limited to this. For example, another sensor (such as a human detecting sensor) that can directly or indirectly detect whether a person is present may be used to determine the the usage status of each space on each floor. However, for the purpose of simplicity of description, the following description assumes that the usage status of each space on each floor is determined by monitoring whether the entrance is locked.

If an entrance of a target space of a target floor is locked, for example, the building management system 210 determines that there is no person using the target space of the target floor (i.e., being in non-use). If the entrance of the target space of the target floor is opened, for example, the building management system 210 determines that there is a person using the target space of the target floor (i.e., being in use). The usage status of each floor that is determined by the building management system 210 (information indicating being in non-use or information indicating being in use) is transmitted to the smart window control system 220.

The smart window control system 220 controls the transmittance of the smart windows 120_11 to 120_15. The smart window control system 220 operates in a normal mode if the building management system 210 determines that the usage status of the target space of the floor indicated by the dotted line 130 in FIG. 1 is being in use and a corresponding air conditioning system is in operation.

With respect to the above, the smart window control system 220 operates in a prediction mode if the building management system 210 determines that the usage status of the target space of the floor indicated by the dotted line 130 in FIG. 1 is being in non-use and the corresponding air conditioning system is stopped.

When operating in the prediction mode, the smart window control system 220 obtains ON/OFF information, actually measured indoor solar irradiance, actually measured outdoor solar irradiance, actually measured indoor temperature, actually measured outdoor temperature, and an indoor temperature setting from the air conditioning system 230. Additionally, when operating in the prediction mode, the smart window control system 220 obtains a predicted value of environment information (predicted temperature transition information and predicted solar irradiance transition information) from an external network 250.

The ON/OFF information is information indicating whether the air conditioning system 230 is in operation or stopped (here, the OFF information further includes information indicating a timing when the air conditioning system 230 restarts). The actually measured indoor irradiance is an output value of an indoor solar irradiance sensor that measures the indoor solar irradiance. The actually measured outdoor solar irradiance is an output value of an outdoor solar irradiance sensor that measures the outdoor solar irradiance. The actually measured indoor temperature is an output value of an indoor temperature sensor that measures the indoor temperature. The actually measured outdoor temperature is an output value of an outdoor temperature sensor that measures the outdoor temperature. The set indoor temperature is the temperature set for the space controlled by the air conditioning system 230.

The predicted values of the environment information include predicted temperature transition information and predicted solar irradiance transition information. The predicted temperature transition information is, for example, a predicted value of the outdoor temperature transition in a stop interval of the air conditioning system 230. The predicted solar irradiance transition information is, for example, a predicted value of the outdoor solar irradiance transition in the stop interval of the air conditioning system 230.

Here, if the inside of the floor indicated by the dotted line 130 in FIG. 1 is formed by one space, the smart window control system 220 is also formed by one system. If the inside of the floor indicated by the dotted line 130 in FIG. 1 is formed by multiple spaces and the temperature is controlled by a separate air conditioning system in each of the multiple spaces, the smart window control system 220 is also formed by separate systems.

<Example of a Configuration of the Smart Window Control System>

Figure 3:
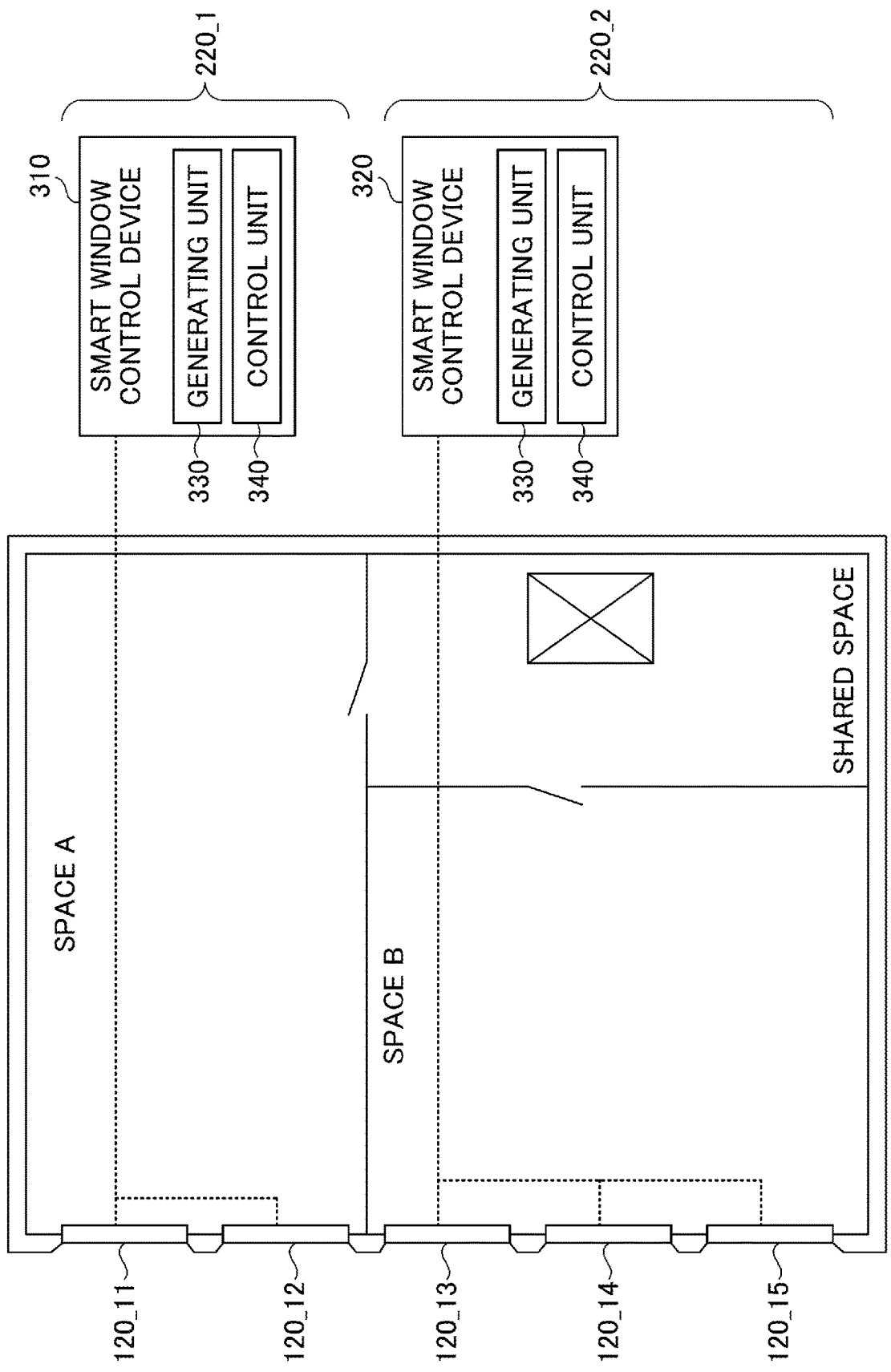
FIG. 3 is a diagram illustrating an example of a configuration of the smart window control system.

Next, an example of a configuration of the smart window control system 220 formed on the floor indicated by the dotted line 130 in FIG. 1 will be described. FIG. 3 is a diagram illustrating the example of the configuration of the smart window control system.

The example of FIG. 3 indicates that the floor indicated by the dotted line 130 is formed of three spaces (spaces A, B, and shared space). A smart window control system 220_1 is formed in the space A and includes a smart window control device 310, a smart window 120_11, and a smart window 120_12.

The smart window control system 220_2 is formed in the space B and includes a smart window control device 320, a smart window 120_13, a smart window 120_14, and a smart window 120_15.

Each of the smart window control devices 310 and 320 functions as a generating unit 330 and a control unit 340 by executing a smart window control program. The generating unit 330 generates a model (i.e., a temperature transition prediction model) that reproduces the temperature characteristic of the space A (or the space B). The control unit 340 predicts the temperature transition of the space A (or the space B), in a case of controlling the transmittance of the smart window with a predetermined transmittance pattern, by using the predicted value of the environment information in the stop interval, based on the generated temperature transition prediction model. The control unit 340 extracts a temperature transition, in which the temperature of the space A (or the space B) to be observed at the timing when the air conditioning system 230 restarts is closest to the set indoor temperature among predicted temperature transitions, and controls the transmittance of the smart window so that the extracted temperature transition is achieved.

<Example of a Configuration of the Air Conditioning System>

Figure 4:
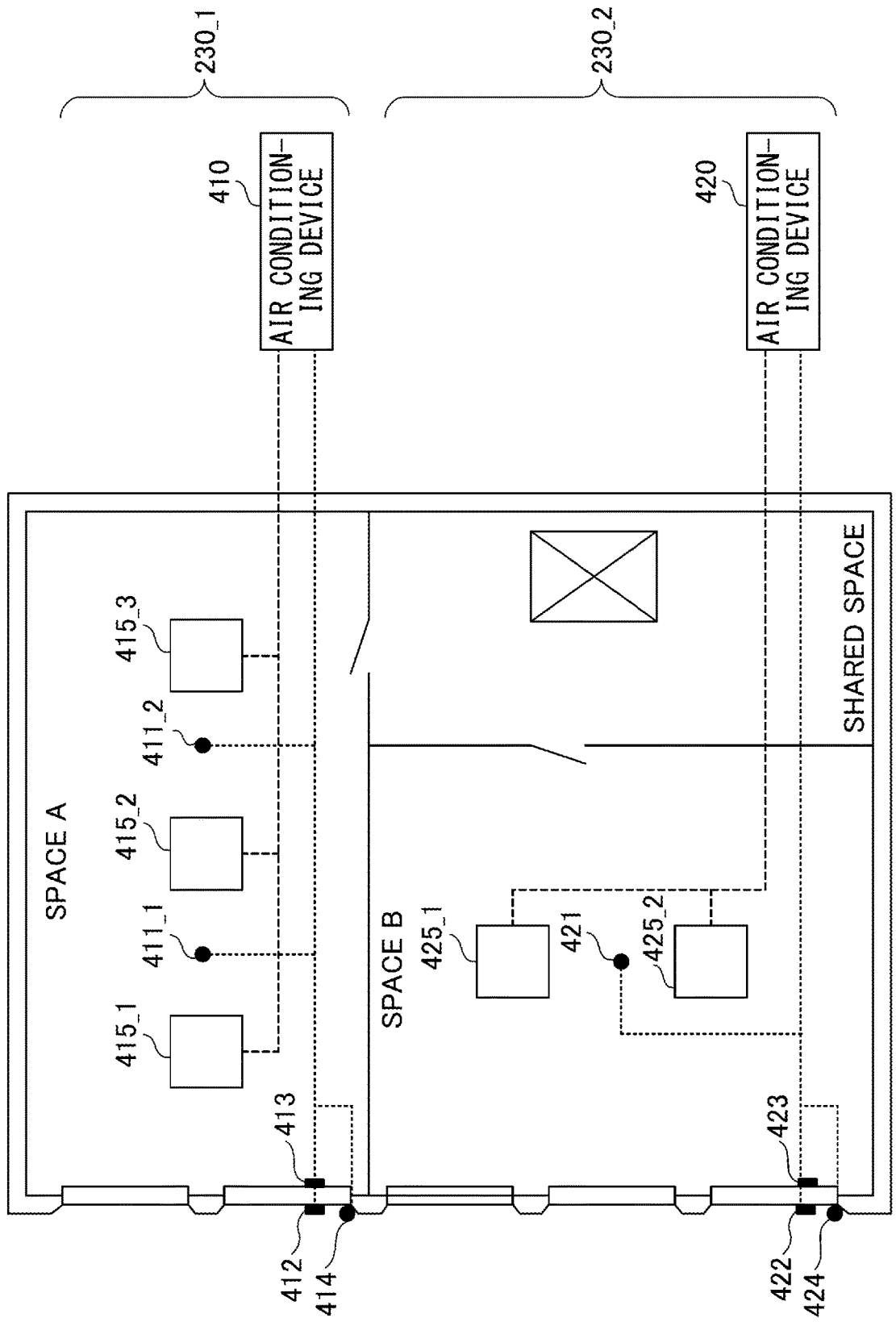
FIG. 4 is a diagram illustrating an example of a configuration of an air conditioning system.

Next, the air conditioning system 230 formed on the floor indicated by the dotted line 130 in FIG. 1 will be described. FIG. 4 is a diagram illustrating an example of a configuration of the air conditioning system.

In the air conditioning system 230, an air conditioning system 230_1 is formed in the space A. As illustrated in FIG. 4, the air conditioning system 230_1 includes an air conditioning device 410, indoor temperature sensors 411_1 and 411_2, an outdoor solar irradiance sensor 412, an indoor solar irradiance sensor 413, an outdoor temperature sensor 414, and air outlets 415_1 to 415_3.

The air conditioning system 230_2 is formed in the space B. As illustrated in FIG. 4, the air conditioning system 230_2 includes an air conditioning device 420, an indoor temperature sensor 421, an outdoor solar irradiance sensor 422, an indoor solar irradiance sensor 423, an outdoor temperature sensor 424, and air outlets 425_1 and 425_2.

<Smart Window Control Device>

Figure 5:
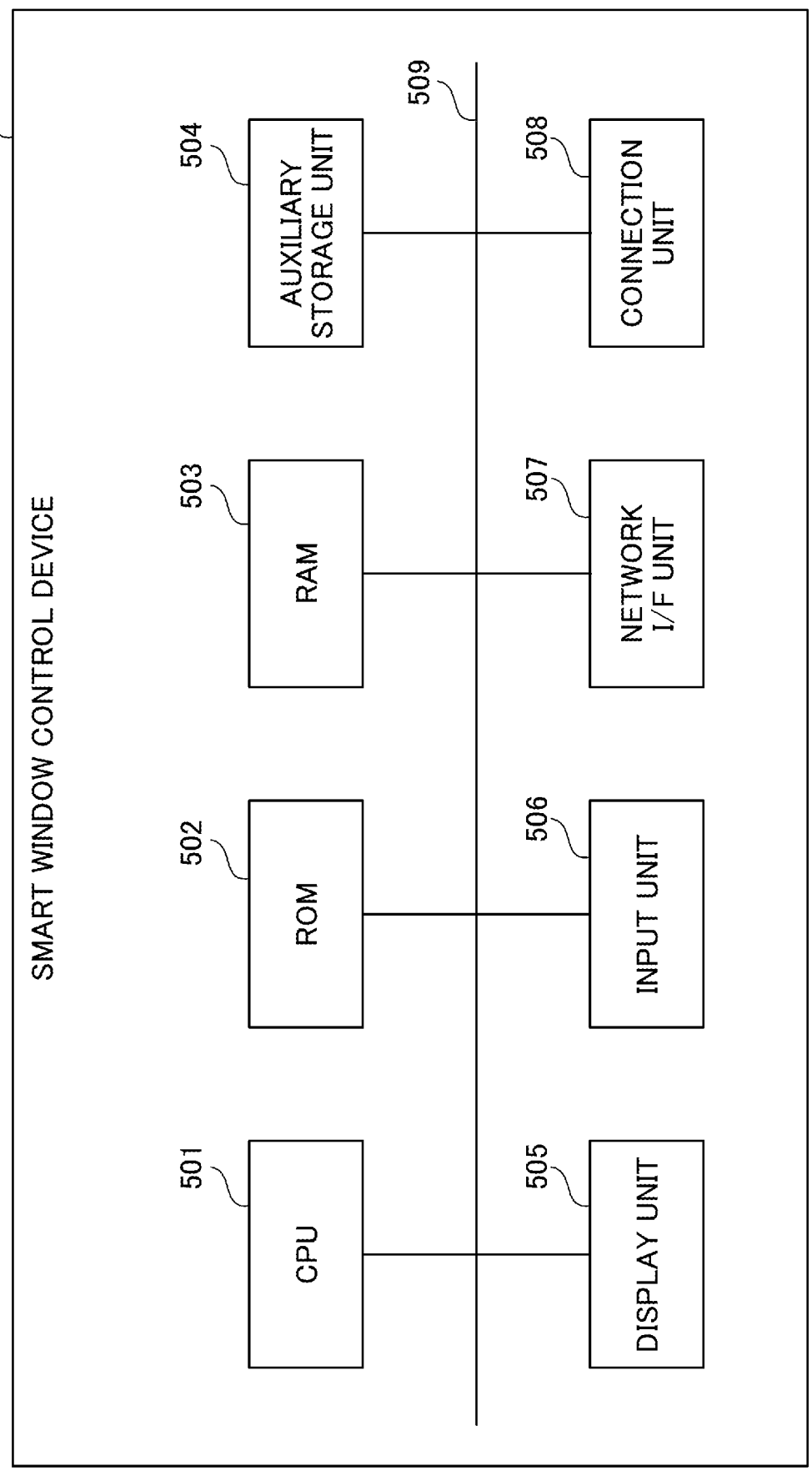
FIG. 5 is a diagram illustrating an example of a hardware configuration of the smart window control device.

Next, a hardware configuration of the smart window control devices 310 and 320 will be described. FIG. 5 is a diagram illustrating an example of the hardware configuration of the smart window control device. As illustrated in FIG. 5, each of the smart window control devices 310 and 320 includes a central processing unit (CPU) 501, a read only memory (ROM) 502, and a random access memory (RAM) 503. The CPU 501, the ROM 502, and the RAM 503 form what is called a computer. Additionally, each of the smart window control devices 310 and 320 includes an auxiliary storage unit 504, a display unit 505, an input unit 506, a network interface (I/F) unit 507, and a connection unit 508. Each hardware component of the smart window control devices 310 and 320 is interconnected through a bus 509.

The CPU 501 is a device that executes various programs (for example, a smart window control program and the like) installed in the auxiliary storage unit 504. The ROM 502 is a non-volatile memory. The ROM 502 functions as a main storage device that stores various programs, data, and the like required for the CPU 501 to execute various programs installed in the auxiliary storage unit 504. Specifically, the ROM 502 stores a boot program, such as the basic input/output system (BIOS) and the extensible firmware interface (EFI).

The RAM 503 is a volatile memory, such as a dynamic random access memory (DRAM) or a static random access memory (SRAM). The RAM 503 functions as a main storage device that provides a workspace deployed when various programs installed in the auxiliary storage unit 504 are executed by the CPU 501.

The auxiliary storage unit 504 is an auxiliary storage device that stores various programs and information used when various programs are executed.

The display unit 505 is a display device that displays an internal state of the smart window control devices 310 and 320. The input unit 506 is an input device for an administrator of the smart window control devices 310 and 320 to input various instructions to the smart window control devices 310 and 320.

The network I/F unit 507 is a communication device that connects to the external network 250. The connection unit 508 is a connection device that connects to the LAN 240.

<Functional Configuration of the Smart Window Control Device>

Next, a functional configuration of the smart window control device will be described. Here, because the smart window control device 310 and the smart window control device 320 have substantially the same configuration, the smart window control device 310 will be described below for simplification of the description.

Figure 6:
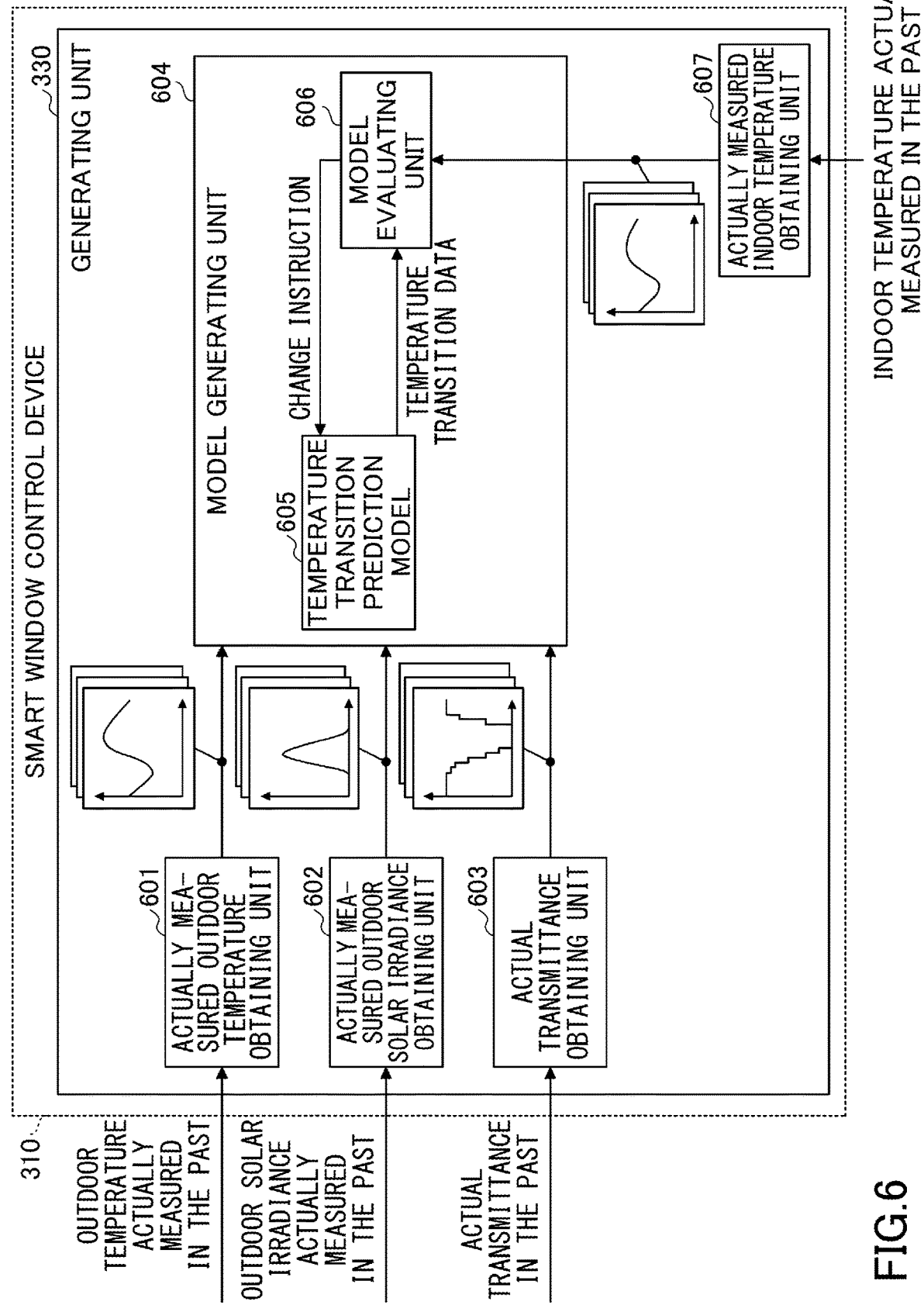
FIG. 6 is a diagram illustrating an example of a functional configuration of a generating unit of the smart window control device.

(1) Functional Configuration of the Generating Unit of the Smart Window Control Device First, a functional configuration of the generating unit 330 of the smart window control device 310 will be described. FIG. 6 is a diagram illustrating an example of the functional configuration of the generating unit of the smart window control device.

As illustrated in FIG. 6, the generating unit 330 of the smart window control device 310 includes an actually measured outdoor temperature obtaining unit 601, an actually measured outdoor solar irradiance obtaining unit 602, an actual transmittance obtaining unit 603, a model generating unit 604, and an actually measured indoor temperature obtaining unit 607.

The actually measured outdoor temperature obtaining unit 601 obtains transition data of the outdoor temperature actually measured by the outdoor temperature sensor 414 in the past for each predetermined time range (for example, 24 hours) and inputs the transition data to the model generating unit 604.

The actually measured outdoor solar irradiance obtaining unit 602 obtains transition data of the outdoor temperature actually measured by the outdoor solar irradiance sensor 412 in the past for each predetermined time range and inputs the transition data to the model generating unit 604.

The actual transmittance obtaining unit 603 obtains transition data of a control result (i.e., transmittance) performed by the control unit 340 for each predetermined time range and inputs the transition data to the model generating unit 604.

The model generating unit 604 is an example of a generating unit and includes a temperature transition prediction model 605 and a model evaluating unit 606. The temperature transition prediction model 605 is a machine learning model and outputs, in response to transition data of the actually measured outdoor temperature, the actually measured outdoor solar irradiance, and the control result (i.e., transmittance) over a predetermined time range being input by the model generating unit 604, temperature transition data over the predetermined time range. The temperature transition prediction model 605 receives an instruction to change model parameters from the model evaluating unit 606 in response to the temperature transition data over the predetermined time range being output and performs machine learning by changing the model parameters.

The model evaluating unit 606 calculates error between the temperature transition data over the predetermined time range that is output by the temperature transition prediction model 605 and the transition data of the indoor temperature actually measured in the past over the predetermined time range that is notified by the actually measured indoor temperature obtaining unit 607. The model evaluating unit 606 outputs a change instruction to change the model parameters to the temperature transition prediction model 605 based on the calculated error.

The actually measured indoor temperature obtaining unit 607 obtains the transition data of the indoor temperature over the predetermined time range that is actually measured by the indoor temperature sensors 411_1 and 411_2 in the past and notifies the model evaluating unit 606 of the transition data.

Figure 7:
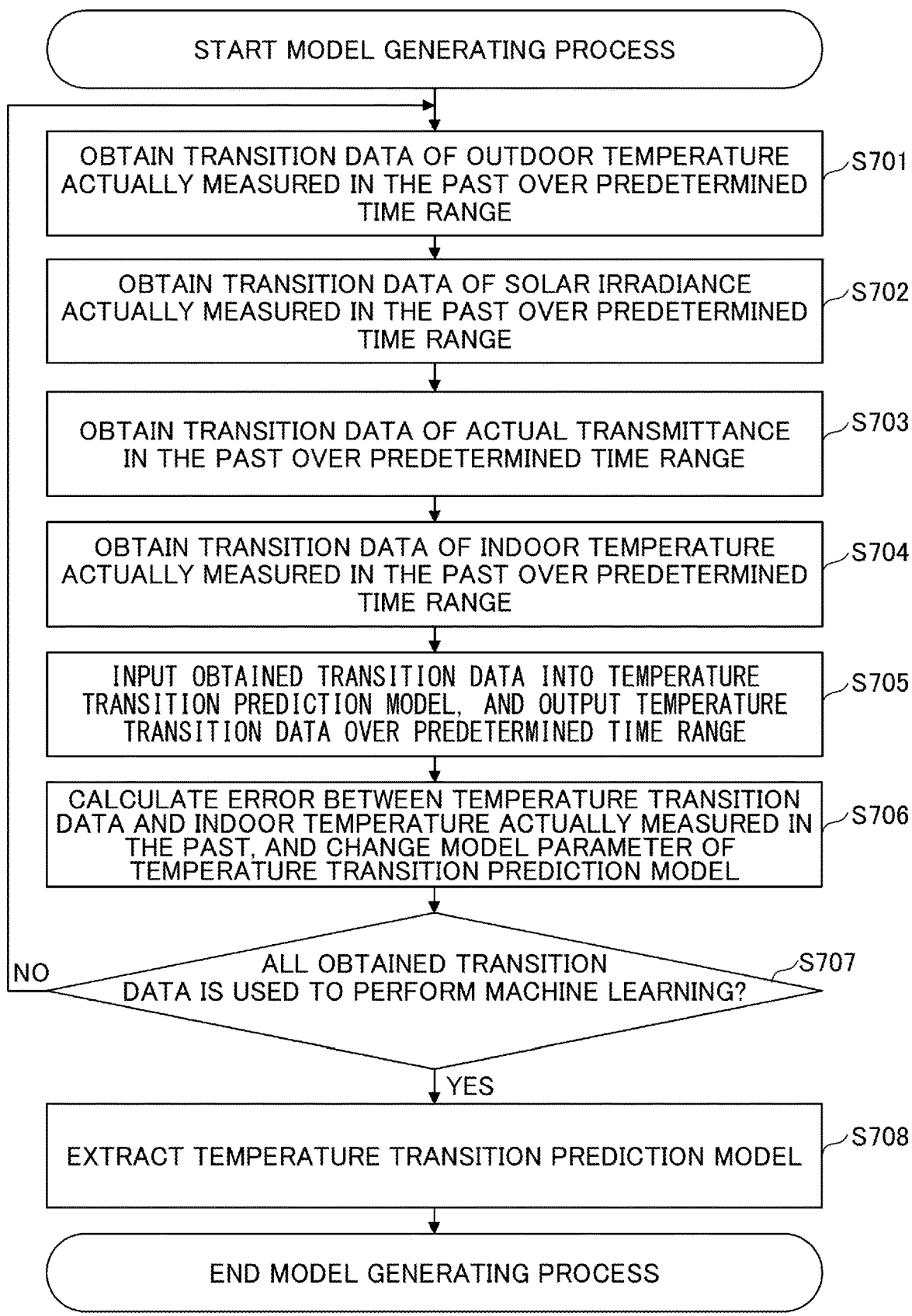
FIG. 7 is a flowchart illustrating a flow of a model generating process performed by a generating unit of the smart window control device.

(2) Flow of a Model Generating Process Performed by the Generating Unit of the Smart Window Control Device Next, a flow of a model generating process performed by the generating unit 330 of the smart window control device 310 will be described. FIG. 7 is a flowchart illustrating the flow of the model generating process performed by the generating unit of the smart window control device.

In step S701, the actually measured outdoor temperature obtaining unit 601 obtains the transition data of the outdoor temperature actually measured in the past over the predetermined time range.

In step S702, the actually measured outdoor solar irradiance obtaining unit 602 obtains the transition data of the outdoor solar irradiance actually measured in the past over the predetermined time range.

In step S703, the actual transmittance obtaining unit 603 obtains the transition data of the control result in the past over the predetermined time range.

In step S704, the actually measured indoor temperature obtaining unit 607 obtains the transition data of the indoor temperature actually measured in the past over the predetermined time range.

In step S705, the model generating unit 604 inputs the following data to the temperature transition prediction model 605.
　the transition data of the outdoor temperature actually measured in the past over the predetermined time range
　the transition data of the outdoor solar irradiance actually measured in the past over the predetermined time range
　the transition data of the control result in the past over the predetermined time range Then, the temperature transition prediction model 605 outputs the temperature transition data over the predetermined time range.

In step S706, the model evaluating unit 606 calculates the error between the output temperature transition data over the predetermined time range and the obtained transition data of the indoor temperature actually measured in the past over the predetermined time range. The model evaluating unit 606 changes the model parameters of the temperature transition prediction model 605 based on the calculated error. This enables the model generating unit 604 to perform machine learning on the temperature transition prediction model 605 by using the transition data of the indoor temperature actually measured in the past over the predetermined time range as correct data.

In step S707, the model generating unit 604 determines whether machine learning has been performed on the temperature transition prediction model 605 by using all the transition data obtained in step S701 to step S704.

In step S707, if it is determined that there is transition data that is not used for machine learning (i.e., NO in step S707), the process returns to step S701.

In step S707, if it is determined that the machine learning has been performed on the temperature transition prediction model 605 by using all the transition data (i.e., YES in step S707), the process proceeds to step S708.

In step S708, the model generating unit 604 extracts the learned temperature transition prediction model 605 on which the machine learning is completed, sets the extracted temperature transition prediction model 605 to the control unit 340, and terminates the model generating process.

Figure 8:
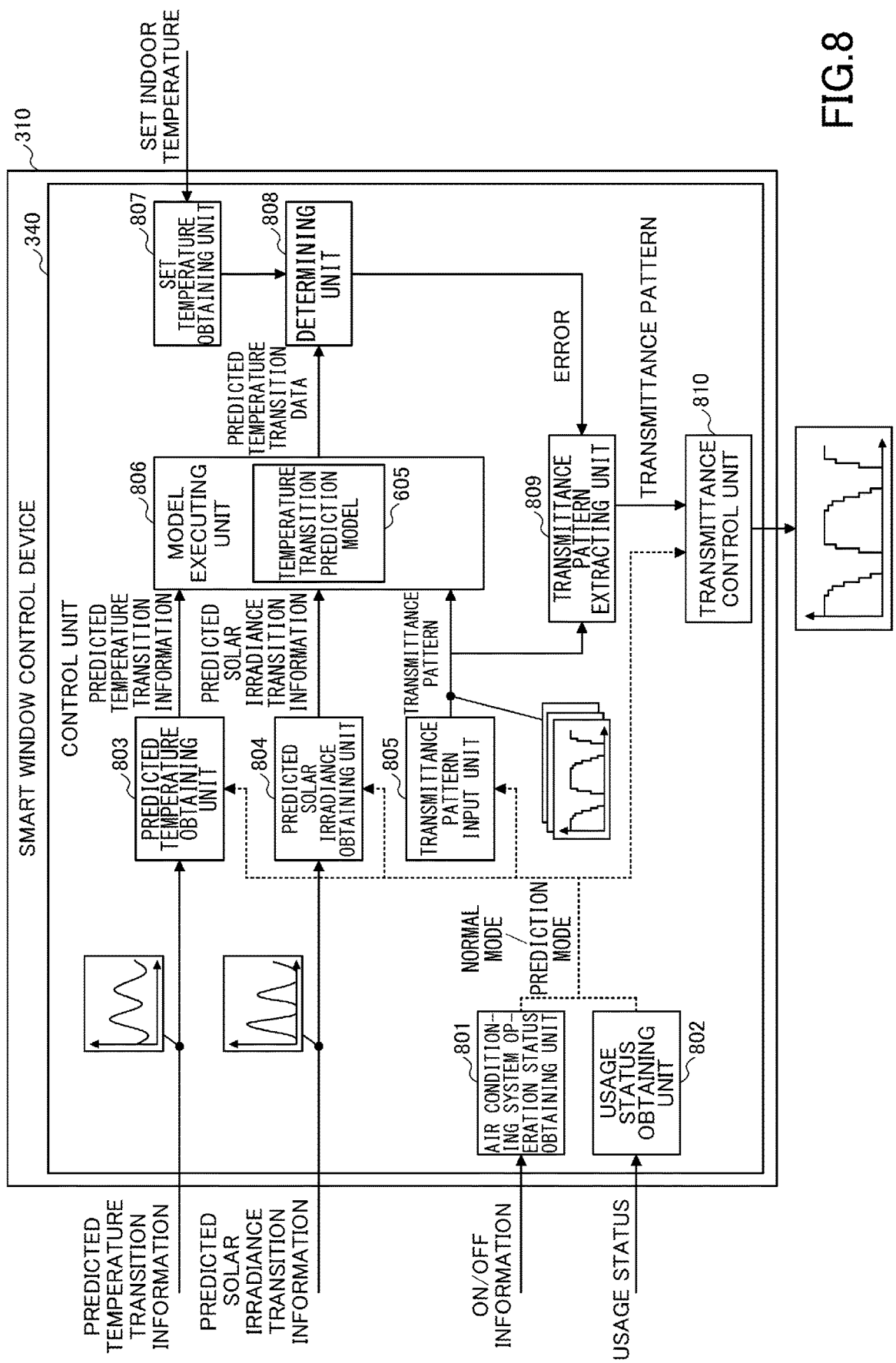
FIG. 8 is a first diagram illustrating an example of a functional configuration of a control unit of the smart window control device.

(3) Functional Configuration of the Control Unit of the Smart Window Control Device Next, a functional configuration of the control unit 340 included in the smart window control device 310 will be described. FIG. 8 is a first diagram illustrating an example of the functional configuration of the control unit of the smart window control device.

As illustrated in FIG. 8, the control unit 340 of the smart window control device 310 includes an air conditioning system operation status obtaining unit 801, a usage status obtaining unit 802, a predicted temperature obtaining unit 803, a predicted solar irradiance obtaining unit 804, and a transmittance pattern input unit 805. Additionally, the control unit 340 of the smart window control device 310 includes a model executing unit 806, a set temperature obtaining unit 807, a determining unit 808, a transmittance pattern extracting unit 809, and a transmittance control unit 810.

The air conditioning system operation status obtaining unit 801 obtains the ON/OFF information from the air conditioning system 230_1. The usage status obtaining unit 802 obtains the usage status of the space A from the building management system 210.

If the air conditioning system operation status obtaining unit 801 obtains OFF information indicating being stopped, and the usage status obtaining unit 802 obtains information indicating being in non-use, the control unit 340 transitions to the prediction mode.

If the air conditioning system operation status obtaining unit 801 obtains ON information indicating being in operation, the control unit 340 transitions to the normal mode.

The predicted temperature obtaining unit 803 is an example of an obtaining unit, and obtains the predicted temperature transition information in a prediction mode interval from the external network 250 when the control unit 340 transitions to the prediction mode. The prediction mode interval is an interval specified based on the time when the control unit 340 transitions to the prediction mode and the time when the control unit 340 transitions to the normal mode next. In the present embodiment, the prediction mode interval is equal to a stop interval of the air conditioning system 230_1. Thus, in the following, the timing when the air conditioning system 230_1 restarts is referred to as "the timing immediately after the prediction mode interval".

The predicted solar irradiance obtaining unit 804 is an example of the obtaining unit. When the control unit 340 transitions to the prediction mode, the predicted solar irradiance transition information in the prediction mode interval is obtained from the external network 250.

The transmittance pattern input unit 805 includes multiple transmittance transition patterns in the predetermined time range, and, by combining the transition patterns, generates multiple transmittance transition patterns in the prediction mode interval (which will be referred to as "transmittance patterns").

The model executing unit 806 is an example of a calculating unit and multiple transmittance patterns are sequentially input into the learned temperature transition prediction model 605 together with the predicted temperature transition information and the predicted solar irradiance transition information in the prediction mode interval to execute the learned temperature transition prediction model 605. With this operation, the learned temperature transition prediction model 605 sequentially outputs the predicted temperature transition data in the prediction mode interval.

The set temperature obtaining unit 807 obtains, from the air conditioning system 230_1, the indoor temperature set in the air conditioning system 230_1 as a temperature setting value for the space A immediately after the prediction mode interval.

The determining unit 808 extracts the temperature immediately after the prediction mode interval from multiple predicted temperature transition data sequentially output from the learned temperature transition prediction model 605 and calculates the error from the set indoor temperature obtained by the set temperature obtaining unit 807. The determining unit 808 notifies the transmittance pattern extracting unit 809 of the calculated error.

The transmittance pattern extracting unit 809 is an example of an extracting unit. The transmittance pattern extracting unit 809 extracts the transmittance pattern that minimizes the error notified by the determining unit 808, and notifies the transmittance control unit 810 of the transmittance pattern.

When the control unit 340 transitions to the prediction mode, the transmittance control unit 810 waits until the transmittance pattern is notified from the transmittance pattern extracting unit 809. When the transmittance pattern is notified from the transmittance pattern extracting unit 809, the transmittance control unit 810 controls the transmittance of the smart windows 120_11 and 120_12 in accordance with the transmittance pattern. The transmittance control unit 810 continues the control in accordance with the transmittance pattern during the prediction mode interval.

<Description of a Mode Transition>

Figure 9:
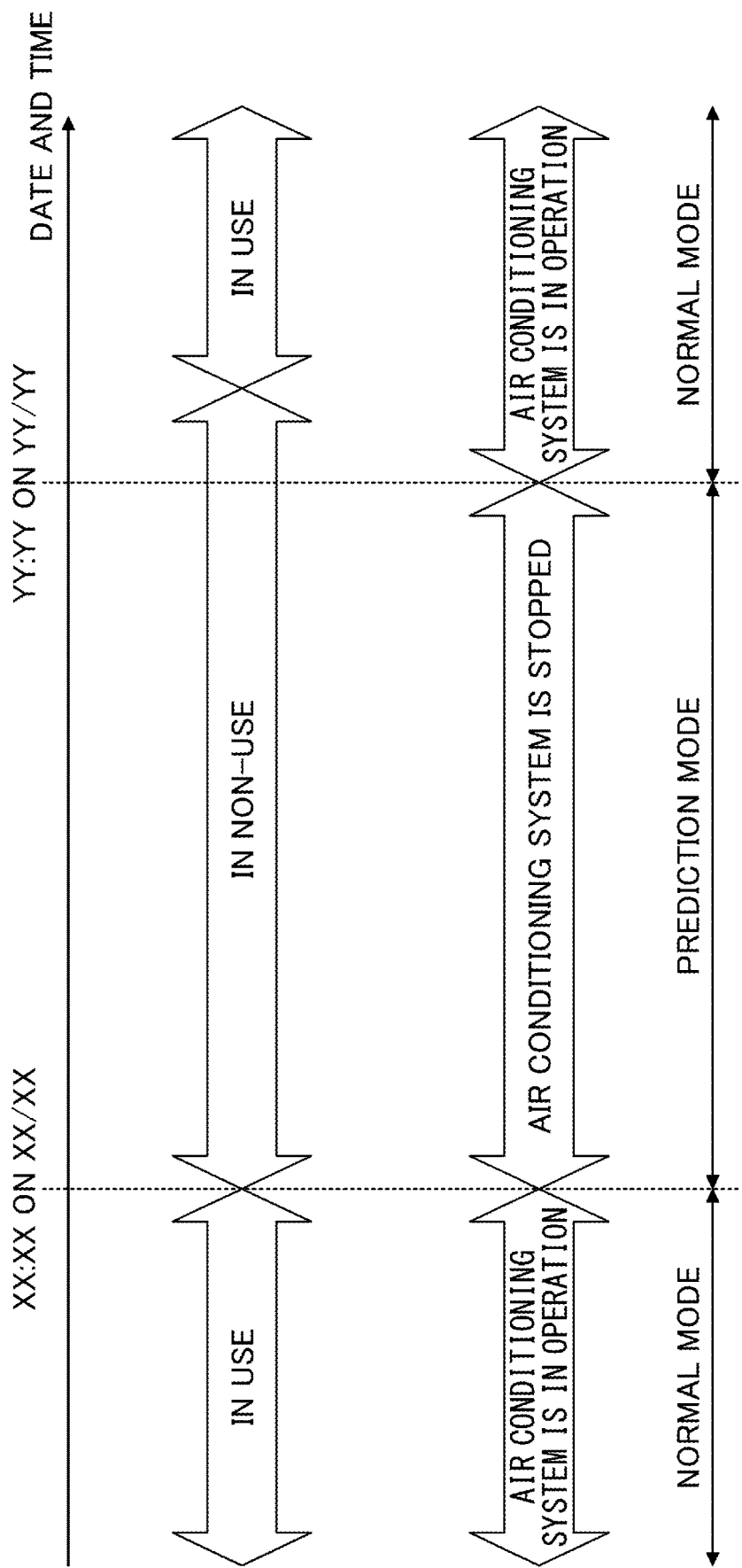
FIG. 9 is a drawing illustrating an example of a mode transition of the control unit of the smart window control device.

Next, a mode transition of the control unit 340 of the smart window control device 310 will be described. FIG. 9 is a drawing illustrating an example of the mode transition of the control unit of the smart window control device.

As illustrated in FIG. 9, in a state in which information indicating that the space A is in use is notified from the building management system 210 and the ON information is notified from the air conditioning system 230_1, the control unit 340 operates in the normal mode. The example of FIG. 9 indicates that the control unit 340 has operated in the normal mode until "XX:XX [time] on XX/XX [date]".

In the present embodiment, the air conditioning system 230_1 is configured to stop when a last user who uses the space A leaves the day before a holiday and the space A is locked.

With respect to the above, in the present embodiment, the date and time when the air conditioning system 230_1 restarts after a holiday is predetermined (regardless of whether a user of the space A has opened the lock). The example of FIG. 9 indicates that the date and time when the air conditioning system 230_1 restarts is determined as "YY:YY [time] on YY/YY [date]".

As described above, the OFF information obtained by the air conditioning system operation status obtaining unit 801 includes the timing when the air conditioning system 230_1 restarts. Thus, the control unit 340 can specify an interval from "XX:XX [time] on XX/XX [date]" (i.e., first time) to "YY:YY [time] on YY/YY [date]" (i.e., second time), which is when a predetermined time period has elapsed after "XX:XX [time] on XX/XX [date]", based on the OFF information, as the prediction mode interval in which the control unit 340 operates in the prediction mode.

<Specific Example of an Operation in the Prediction Mode Interval>

Next, a specific example of an operation of the control unit 340 in the prediction mode interval will be described.

(1) Predicted Value of the Environment Information in the Prediction Mode Interval First, a specific example of the predicted temperature transition information in the prediction mode interval that is obtained by the predicted temperature obtaining unit 803 of the control unit 340 and a specific example of the predicted solar irradiance transition information in the prediction mode interval that is obtained by the predicted solar irradiance obtaining unit 804 of the control unit 340 will be described.

FIG. 10 is of graphs illustrating a specific example of the predicted value of the environment information in the prediction mode interval. The example in FIG. 10 illustrates a case in which "XX:XX [time] on XX/XX [date]" is Friday night and "YY:YY [time] on YY/YY [date]" is Monday morning. That is, the example of FIG. 10 illustrates a case in which an interval that includes two days of Saturday and Sunday, which are holidays, is the prediction mode interval.

In FIG. 10, 10*a* of FIG. 10 illustrates a specific example of the predicted temperature transition information in the prediction mode interval. According to the example in 10*a* of FIG. 10, it is predicted that the temperature will fall from "XX:XX [time] on XX/XX [date]", at which the control unit 340 is transitioned to the prediction mode, to Saturday morning, and the temperature will rise during Saturday daytime. According to the example in 10*a* of FIG. 10, it is predicted that the temperature will fall from Saturday evening to Sunday morning and rise again during Sunday daytime. Further, it is predicted that the temperature will fall from Sunday evening to Monday morning.

According to the example of 10*a* of FIG. 10, it is predicted that the lowest temperature on Saturday is lower than that on Sunday, but the highest temperature on Saturday is higher than that on Sunday.

10*b* of FIG. 10 illustrates a specific example of the predicted solar irradiance transition information in the prediction mode interval. According to the example of 10*b* of FIG. 10, it is predicted that the solar irradiance will be zero from "XX:XX [time] on XX/XX [date]", at which the control unit 340 is transitioned to the prediction mode, to Saturday morning, and that the solar irradiance will be high during Saturday daytime because of clear weather. According to the example of 10*b* of FIG. 10, it is predicted that the solar irradiance during Sunday daytime will be less than that during Saturday daytime because of cloudy weather during Sunday daytime.

(2) Prediction of the Temperature Transition in the Prediction Mode Interval

Figure 11:
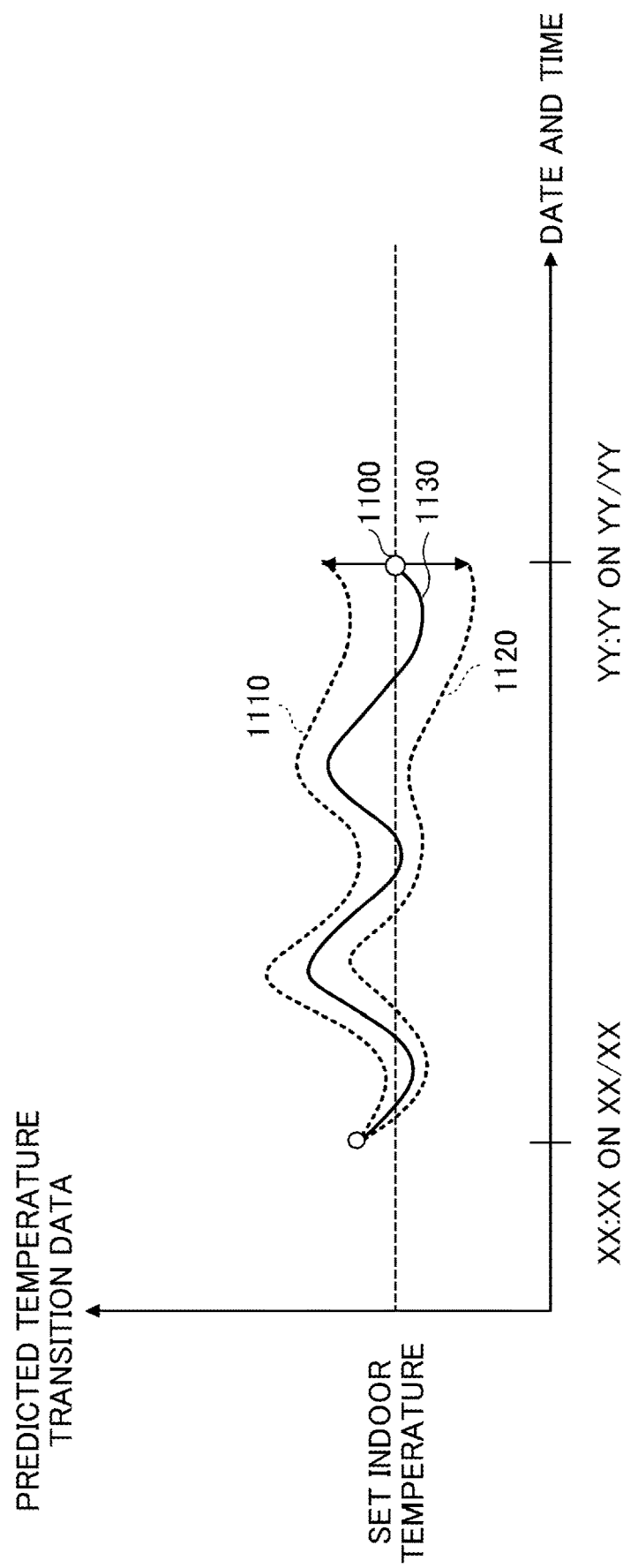
FIG. 11 is of graphs illustrating an example of predicted temperature transition data in the prediction mode interval.

Next, a specific example of the predicted temperature transition data of the space A in the prediction mode interval that is calculated by the model executing unit 806 of the control unit 340 executing the learned temperature transition prediction model 605 will be described. FIG. 11 is a graph illustrating an example of the predicted temperature transition data in the prediction mode interval. As described above, the model executing unit 806 executes the learned temperature transition prediction model 605 by sequentially inputting the predicted temperature transition information, the predicted solar irradiance transition information, and multiple transmittance patterns in the prediction mode interval into the learned temperature transition prediction model 605. With this execution, the learned temperature transition prediction model 605 sequentially outputs the predicted temperature transition data of the space A in the prediction mode interval.

In FIG. 11, the dotted line 1110 indicates predicted temperature transition data of the space A in a case where a transmittance pattern that causes the temperature of the space A to transition at the highest temperature is input. Additionally, the dotted line 1120 indicates predicted temperature transition data of the space A in a case where a transmittance pattern that causes the temperature of the space A to transition at a lowest temperature is input.

As described, depending on the transmittance pattern used in the prediction mode interval, the temperature of the space A at "YY:YY [time] on YY/YY [date]" varies as indicated by the arrows. Here, the example of FIG. 11 assumes that the temperature indicated by the dashed line is set in the air conditioning system 230_1 as the set indoor temperature of the space A immediately after the prediction mode interval (at "YY:YY [time] on YY/YY [date]").

Thus, the transmittance pattern extracting unit 809 of the control unit 340 extracts a transmittance pattern corresponding to the predicted temperature transition data (i.e., the solid line 1130) in which the temperature of the space A immediately after the prediction mode interval (at "YY:YY [time] on YY/YY [date]") is closest to the temperature indicated by the dashed line.

By controlling the transmittance of the smart windows 120_11 and 120_12 by using such a transmittance pattern, the temperature of the space A immediately after the prediction mode interval (at "YY:YY [time] on YY/YY [date]") can be matched with the set indoor temperature. As a result, the load applied on the air conditioning system 230_1 when the air conditioning system 230_1 restarts can be reduced.

<Transmittance Control Process in the Prediction Mode>

Figure 12:
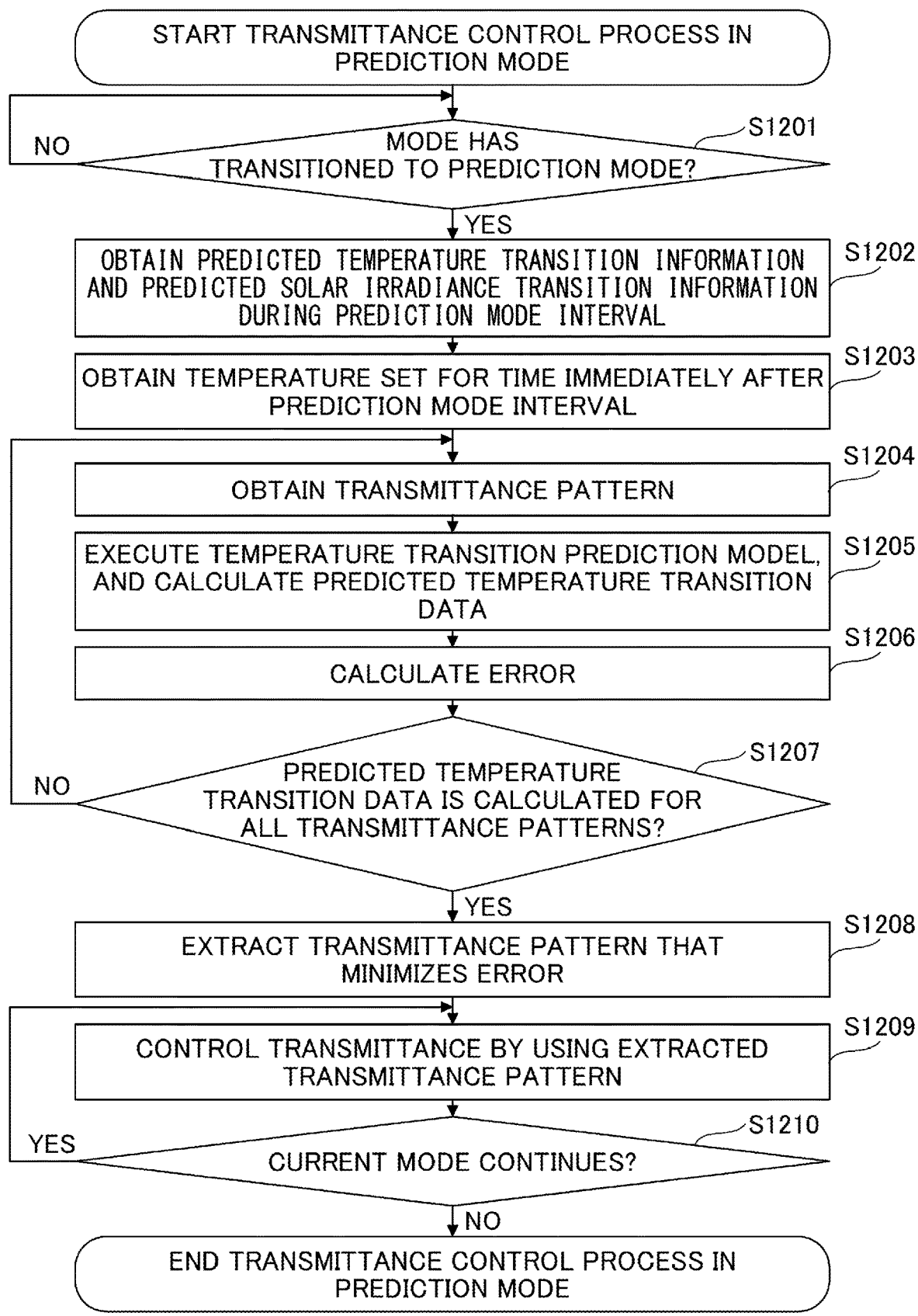
FIG. 12 is a first flowchart illustrating a flow of a transmittance control process in the prediction mode.

Next, a flow of a transmittance control process in the prediction mode will be described. FIG. 12 is a first flowchart illustrating the flow of the transmittance control process in the prediction mode.

In step S1201, the air conditioning system operation status obtaining unit 801 monitors the ON/OFF information notified by the air conditioning system 230_1, and the usage status obtaining unit 802 monitors the usage status of the space A notified by the building management system 210. Then, the control unit 340 determines whether to operate in the normal mode or in the prediction mode. With respect to the above, the predicted temperature obtaining unit 803, the predicted solar irradiance obtaining unit 804, and the transmittance control unit 810 monitor the mode transition of the control unit 340 and determine whether the control unit 340 has transitioned from the normal mode to the prediction mode.

In step S1201, if it is determined that the control unit 340 does not transition from the normal mode to the prediction mode (NO in step S1201), the process waits until it is determined that the control unit 340 has transitioned from the normal mode to the prediction mode.

With respect to the above, in step S1201, if it is determined that the control unit 340 has transitioned from the normal mode to the prediction mode (YES in step S1201), the process proceeds to step S1202.

In step S1202, the predicted temperature obtaining unit 803 obtains the predicted temperature transition information in the prediction mode interval from the external network 250. The predicted solar irradiance obtaining unit 804 obtains the predicted temperature transition information in the prediction mode interval through the external network 250.

In step S1203, the set temperature obtaining unit 807 obtains the indoor temperature set in the air conditioning system 230 as the set indoor temperature of the space A immediately after the prediction mode interval.

In step S1204, the transmittance pattern input unit 805 selects one of the multiple transmittance patterns and notifies the model executing unit 806 of the selected transmittance pattern.

In step S1205, the predicted temperature obtaining unit 803 notifies the model executing unit 806 of the obtained predicted temperature transition information. Additionally, the predicted solar irradiance obtaining unit 804 notifies the model executing unit 806 of the obtained predicted solar irradiance transition information. Further, the model executing unit 806 executes the temperature transition prediction model 605 to calculate the predicted temperature transition data by inputting the predicted temperature transition information, the predicted solar irradiance transition information, and the transmittance pattern into the temperature transition prediction model 605.

In step S1206, the determining unit 808 calculates the error between the temperature immediately after the prediction mode interval in the predicted temperature transition data calculated by the model executing unit 806, and the set indoor temperature of the space A immediately after the prediction mode interval that is obtained by the set temperature obtaining unit 807.

In step S1207, the transmittance pattern input unit 805 determines whether the predicted temperature transition data is calculated for all transmittance patterns. In step S1207, if it is determined that there is a transmittance pattern for which the predicted temperature transition data is not calculated (NO in step S1207), the process returns to step S1204.

In step S1207, if it is determined that the predicted temperature transition data is calculated for all transmittance patterns, the process proceeds to step S1208.

In step S1208, the transmittance pattern extracting unit 809 extracts the transmittance pattern that minimizes the error and notifies the transmittance control unit 810 of the transmittance pattern.

In step S1209, the transmittance control unit 810 starts the transmittance control of the smart window by using the transmittance pattern notified from the transmittance pattern extracting unit 809.

In step S1210, the transmittance control unit 810 determines whether the current mode (here, the prediction mode) continues. In step S1210, if it is determined that the prediction mode continues (YES in step S1210), the process returns to step S1209.

In step S1210, if it is determined that the mode has transitioned from the prediction mode to the normal mode (NO in step S1210), the transmittance control process in the prediction mode is terminated.

<Summary>

As is obvious from the above description, the smart window control device according to the first embodiment is configured to:

control the transmittance of a smart window provided as a window of a space where the temperature is controlled by an air conditioning system in accordance with the set room temperature obtain predicted temperature transition information and predicted solar irradiance transition information in a prediction mode interval from an external network, the prediction mode interval being a stop interval from when an air conditioning system stops to when the air conditioning system restarts generate a temperature transition prediction model that predicts a temperature transition of the space over a predetermined time range, based on the outdoor temperature actually measured in the past, the outdoor solar irradiance actually measured in the past, and the actual transmittance in the past calculate multiple predicted temperature transition data in the prediction mode interval by sequentially inputting multiple transmittance patterns into the generated temperature transition prediction model together with predicted temperature transition information and predicted solar irradiance transition information extract a transmittance pattern used to calculate predicted temperature transition data in which the temperature immediately after the prediction mode interval is closest to the set indoor temperature immediately after the prediction mode interval, among the multiple calculated predicted temperature transition data, and use the transmittance pattern to control the transmittance of the smart window in the prediction mode interval.

As described, in the smart window control device according to the first embodiment, the temperature of the space in the prediction mode interval is transitioned based on the predicted temperature transition so that the temperature immediately after the prediction mode interval approaches the set indoor temperature immediately after the prediction mode interval. According to the smart window control device according to the first embodiment, this can reduce the influence of the time lag from when the transmittance is controlled to when the temperature in the building actually changes.

As a result, according to the smart window control device according to the first embodiment, the load applied on the air conditioning system when the air conditioning system restarts immediately after the prediction mode interval can be reduced.

Second Embodiment

The first embodiment described above is configured to, based on the predicted temperature transition data calculated by the temperature transition prediction prediction model 605, extract a transmittance pattern and control the transmittance of the smart window during the prediction mode interval based on the extracted transmittance pattern.

With respect to the above, the second embodiment is configured to control the transmittance of the smart window so that the temperature of the space during the prediction mode interval transitions in accordance with the predicted temperature transition data calculated by the temperature transition prediction model 605. In the following, the second embodiment will be described focusing on the difference from the first embodiment described above.

<Functional Configuration of the Control Unit of the Smart Window Control Device>

Figure 13:
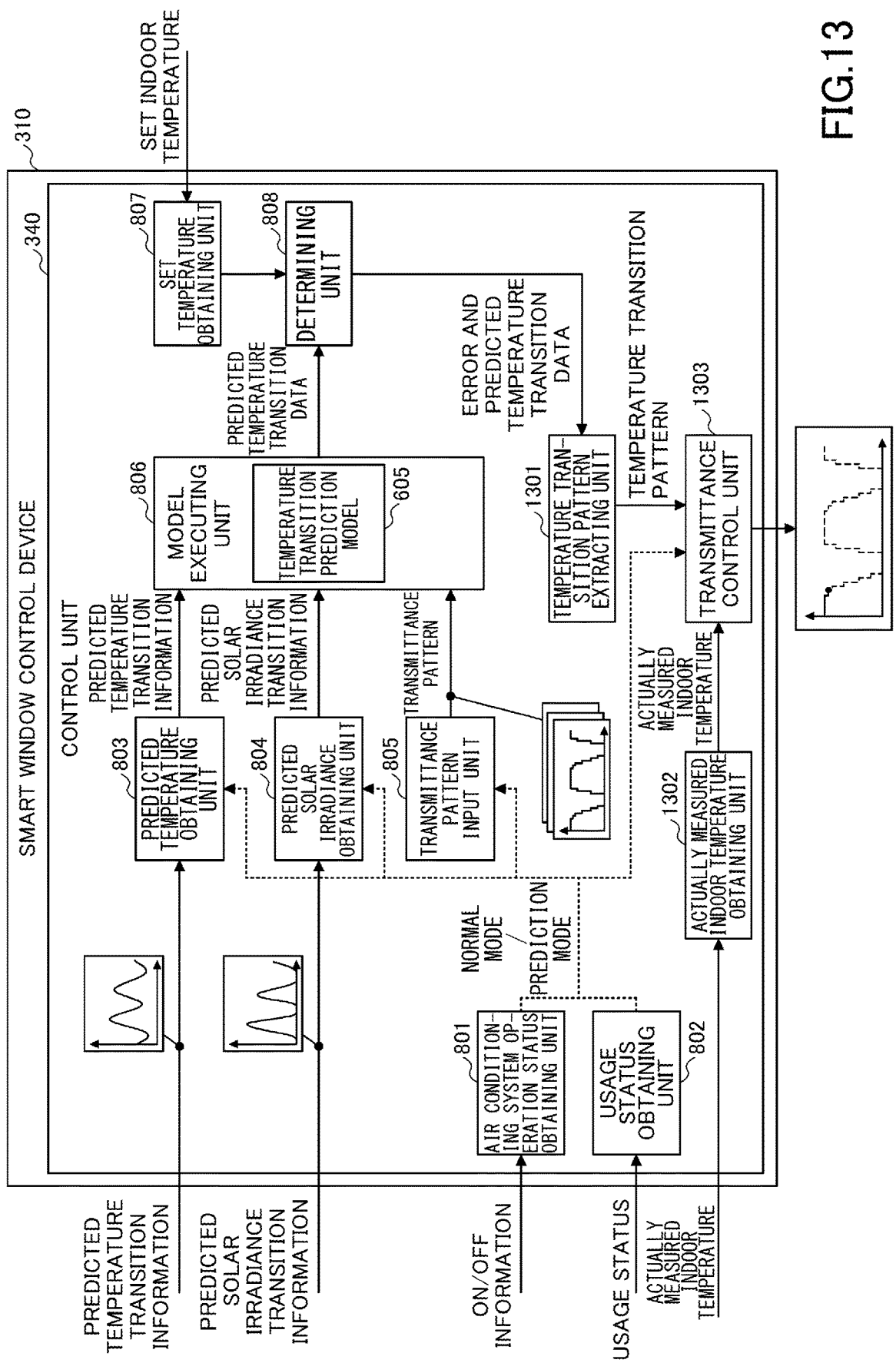
FIG. 13 is a second diagram illustrating an example of the functional configuration of the control unit of the smart window control device.

First, a functional configuration of the control unit 340 of the smart window control device 310 will be described. FIG. 13 is a second diagram illustrating an example of the functional configuration of the control unit of the smart window control device. The difference from FIG. 8 is that in FIG. 13, a temperature transition pattern extracting unit 1301, an actually measured indoor temperature obtaining unit 1302, and a transmittance control unit 1303 are included.

The temperature transition pattern extracting unit 1301 is an example of the extracting unit, and obtains error between respective predicted temperature transition data calculated by inputting multiple transmittance patterns into the temperature transition prediction model 605 and the set indoor temperature, from the determining unit 808.

The temperature transition pattern extracting unit 1301 extracts predicted temperature transition data by which the obtained error is minimized and notifies the transmittance control unit 1303 of the predicted temperature transition data as the temperature transition pattern.

The actually measured indoor temperature obtaining unit 1302 obtains the actually measured indoor temperature at the current time from the air conditioning device 410 and notifies the transmittance control unit 1303 of the actually measured indoor temperature.

When the control unit 340 transitions to the prediction mode, the transmittance control unit 1303 waits until the temperature transition pattern is notified from the temperature transition pattern extracting unit 1301. When the temperature transition pattern is notified from the temperature transition pattern extracting unit 1301, the transmittance control unit 1303 controls the transmittance of the smart windows 120_11 and 120_12 in accordance with the temperature transition pattern. Specifically, the transmittance control unit 1303 compares the indoor temperature actually measured at the current time with the temperature at the current time in the temperature transition pattern, and controls to reduce the transmittance if the temperature actually measured at the current time is higher than the temperature at the current time in the temperature transition pattern. The transmittance control unit 1303 controls to increase the transmittance if the indoor temperature actually measured at the current time is lower than the temperature at the current time in the temperature transition pattern.

<Specific Example of an Operation in the Prediction Mode Interval>

Figure 14:
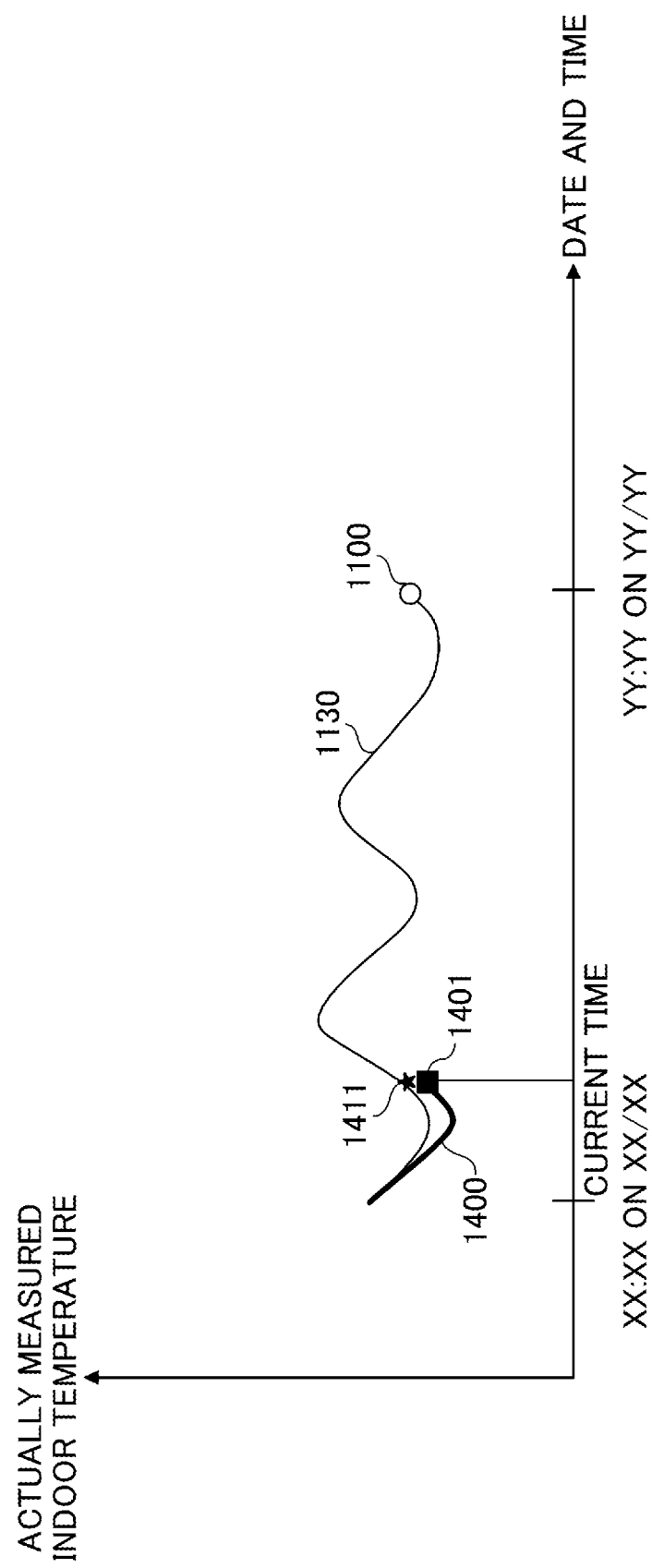
FIG. 14 is a graph illustrating a specific example of an actually measured indoor temperature in the prediction mode interval.

Next, a specific example of an operation of the control unit 340 in the prediction mode interval will be described. FIG. 14 is a graph illustrating a specific example of the actually measured indoor temperature in the prediction mode interval. In FIG. 14, an interval from "XX:XX [time] on XX/XX [date]" to "YY:YY [time] on YY/YY [date]" is the prediction mode interval. In FIG. 14, the solid line 1130 is the temperature transition pattern notified by the temperature transition pattern extracting unit 1301 (i.e., the temperature transition pattern in which the temperature 1100 immediately after the prediction mode interval matches the set indoor temperature immediately after the prediction mode interval).

With respect to the above, the thick solid line 1400 indicates the actually measured indoor temperature from the time when the mode is transitioned to the prediction mode to the current time. Additionally, the reference numeral 1401 indicates the indoor temperature actually measured at the current time, and the reference numeral 1411 indicates the temperature at the current time in the temperature transition pattern (i.e., the solid line 1130). In the example of FIG. 14, because the indoor temperature actually measured at the current time (indicated by the reference numeral 1401) is lower than the temperature (indicated by the reference numeral 1411) at the present time in the temperature transition pattern (indicated by the reference numeral 1130), the transmittance control unit 1303 controls to increase the transmittance.

This enables the transmittance control unit 1303 to change the temperature of the space A during the prediction mode interval in accordance with the temperature transition pattern (indicated by the solid line 1130). Then, the temperature immediately after the prediction mode interval can match the set indoor temperature immediately after the prediction mode interval.

As a result, the load applied on the air conditioning system when the air conditioning system restarts immediately after the prediction interval can be reduced.

<Transmittance Control Process in the Prediction Mode>

Figure 15:
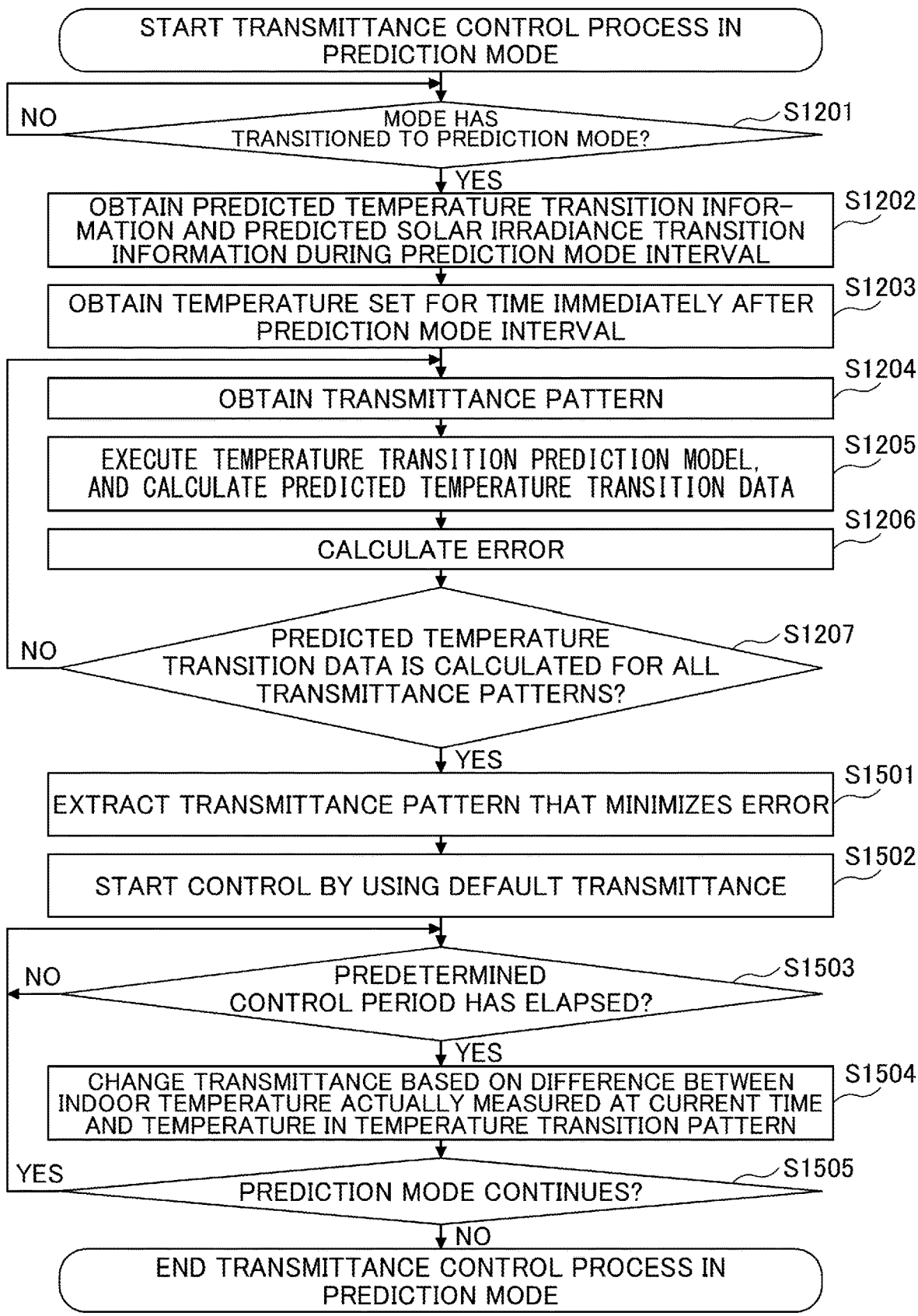
FIG. 15 is a second flowchart illustrating the flow of the transmittance control process in the prediction mode.

Next, a flow of a transmittance control process in the prediction mode will be described. FIG. 15 is a second flowchart illustrating the flow of the transmittance control process in the prediction mode. The difference from the flowchart illustrated in FIG. 12 is in step S1501 to step S1505.

In step S1501, the temperature transition pattern extracting unit 1301 extracts a temperature transition pattern that minimizes the error and notifies the transmittance control unit 1303 of the temperature transition pattern.

In step S1502, the transmittance control unit 1303 starts the control of the transmittance of the smart window with a default transmittance.

In step S1503, the transmittance control unit 1303 determines whether a predetermined control period has elapsed. In step S1503, if it is determined that the predetermined control period has not elapsed (NO in step S1503), the process waits until a predetermined control period has elapsed.

In step S1503, if it is determined that the predetermined control period has elapsed (YES in step S1503), the process proceeds to step S1504.

In step S1504, the transmittance control unit 1303 compares the indoor temperature actually measured at the current time that is obtained by the actually measured indoor temperature obtaining unit 1302 with the temperature at the current time in the temperature transition pattern, and changes the transmittance in accordance with a comparison result.

In step S1505, the transmittance control unit 1303 determines whether the prediction mode continues. In step S1505, if it is determined that the prediction mode continues (YES in step S1505), the process returns to step S1503.

In step S1505, if it is determined that the mode transitions from the prediction mode to the normal mode (NO in step S1505), the transmittance control process in the prediction mode is terminated.

<Summary>

As is obvious from the above description, the smart window control device according to the second embodiment is configured to:

control the transmittance of a smart window provided as a window of a space where the temperature is controlled by an air conditioning system in accordance with the set room temperature obtain predicted temperature transition information and predicted solar irradiance transition information in a prediction mode interval from an external network, the prediction mode being a stop interval from when the air conditioning system stops to when the air conditioning system restarts generate a temperature transition prediction model that predicts temperature transition of the space over a predetermined time range, based on the outdoor temperature actually measured in the past, the indoor solar irradiance actually measured in the past, and the actual transmittance in the past calculate multiple predicted temperature transition data over the prediction mode interval by sequentially inputting multiple transmittance patterns into the generated temperature transition prediction model, together with the predicted temperature transition information and the predicted solar irradiance transition information extract predicted temperature transition data in which the temperature immediately after the prediction mode interval is closest to the set indoor temperature immediately after the prediction mode interval, among the multiple calculated predicted temperature transition data, as a temperature transition pattern, and further use the temperature transition pattern and the actually measured temperature to control the transmittance of the smart window during the prediction mode interval.

As described, the smart window control device according to the second embodiment causes the temperature of the space in the prediction mode interval to transition based on the temperature transition pattern so that the temperature immediately after the prediction mode interval approaches the set indoor temperature immediately after the prediction mode interval. Thus, according to the smart window control device according to the second embodiment, the influence of the time lag from the time when the transmittance is controlled to the time when the temperature in the building actually changes can be reduced.

As a result, according to the smart window control device according to the second embodiment, the load applied on the air conditioning system when the air conditioning system restarts immediately after the prediction mode interval can be reduced.

Third Embodiment

In the first and second embodiments described above, the case in which the smart window control device operates in the prediction mode has been described. With respect to this, in a third embodiment, a case in which the smart window control device operates in the normal mode will be described. In the following, the third embodiment will be described focusing on the difference from the first and second embodiments.

<Specific Example of an Operation in the Normal Mode Interval>

Figure 16:
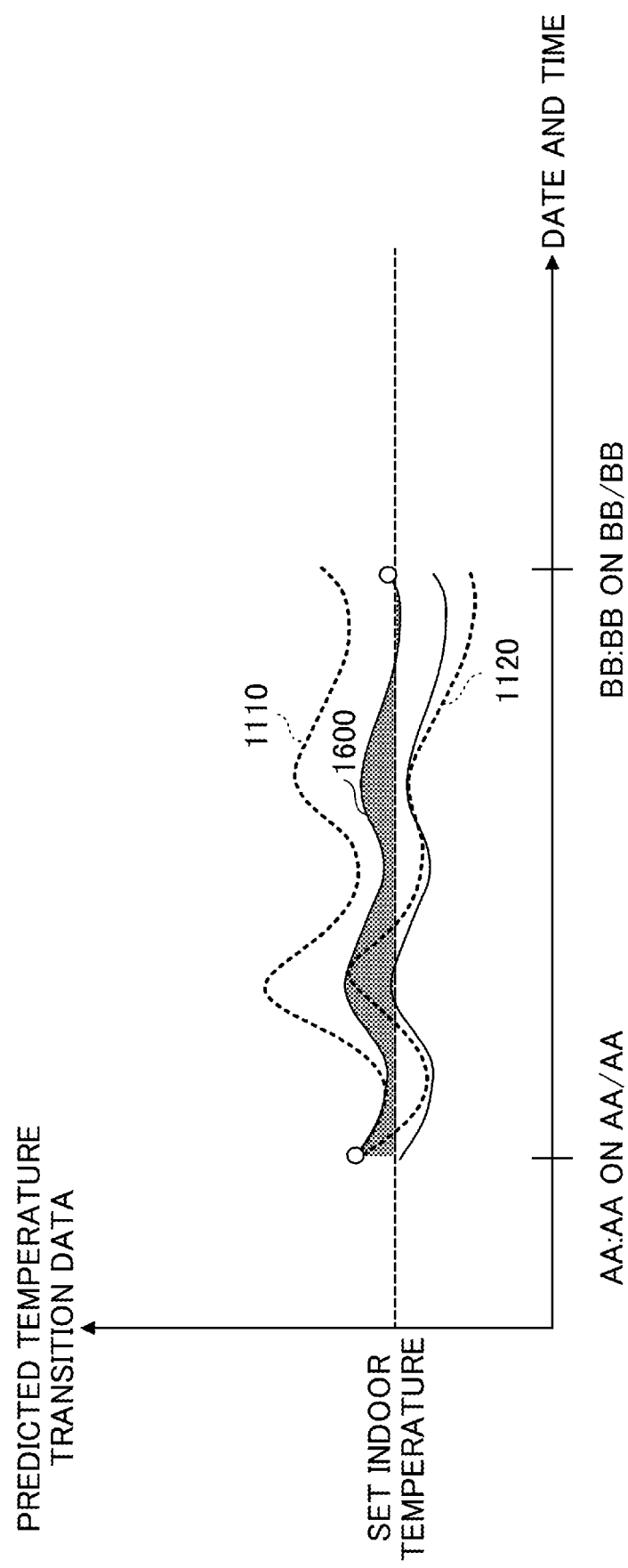
FIG. 16 is a first graph illustrating an example of predicted temperature transition data in a normal mode interval.

First, a specific example of an operation of the control unit 340 in the normal mode interval will be described. FIG. 16 is a first graph illustrating an example of predicted temperature transition data in the normal mode interval. In the example of FIG. 16, the normal mode interval is defined from "AA:AA [time] on AA/AA [date]" (first time) to "BB:BB [time] on BB/BB [date]" (second time), which is when a predetermined time period has elapsed after "AA:AA [time] on AA/AA [date]".

In the third embodiment, the model executing unit 806 executes the learned temperature transition prediction model 605 by sequentially inputting the predicted temperature transition information, the predicted solar irradiance transition information, and multiple transmittance patterns in the normal mode interval into the learned temperature transition prediction model 605. Then, the learned temperature transition prediction model 605 sequentially outputs the predicted temperature transition data of the space A in the normal mode interval.

In FIG. 16, the dotted line 1110 indicates the predicted temperature transition data of the space A in a case where a transmittance pattern that causes the temperature of the space A to transition at a highest temperature is input. Additionally, the dotted line 1120 indicates the predicted temperature data of the space A in a case where a transmittance pattern that causes the temperature of the space A to transition at a lowest temperature is input.

As described above, the temperature transition of the space A in the normal mode interval varies depending on the transmittance pattern used in the normal mode interval. The transmittance pattern extracting unit 809 of the control unit 340 extracts a transmittance pattern corresponding to the predicted temperature transition data (indicated by the solid line 1600) in which an accumulated value of the difference from the set indoor temperature (for example, the area of the gray region of FIG. 16) is minimized. This is because the load during the operation of the air conditioning system 230_1 can be minimized, if the accumulated value of the difference from the set indoor temperature is minimum.

<Transmittance Control Process in the Normal Mode>

Figure 17:
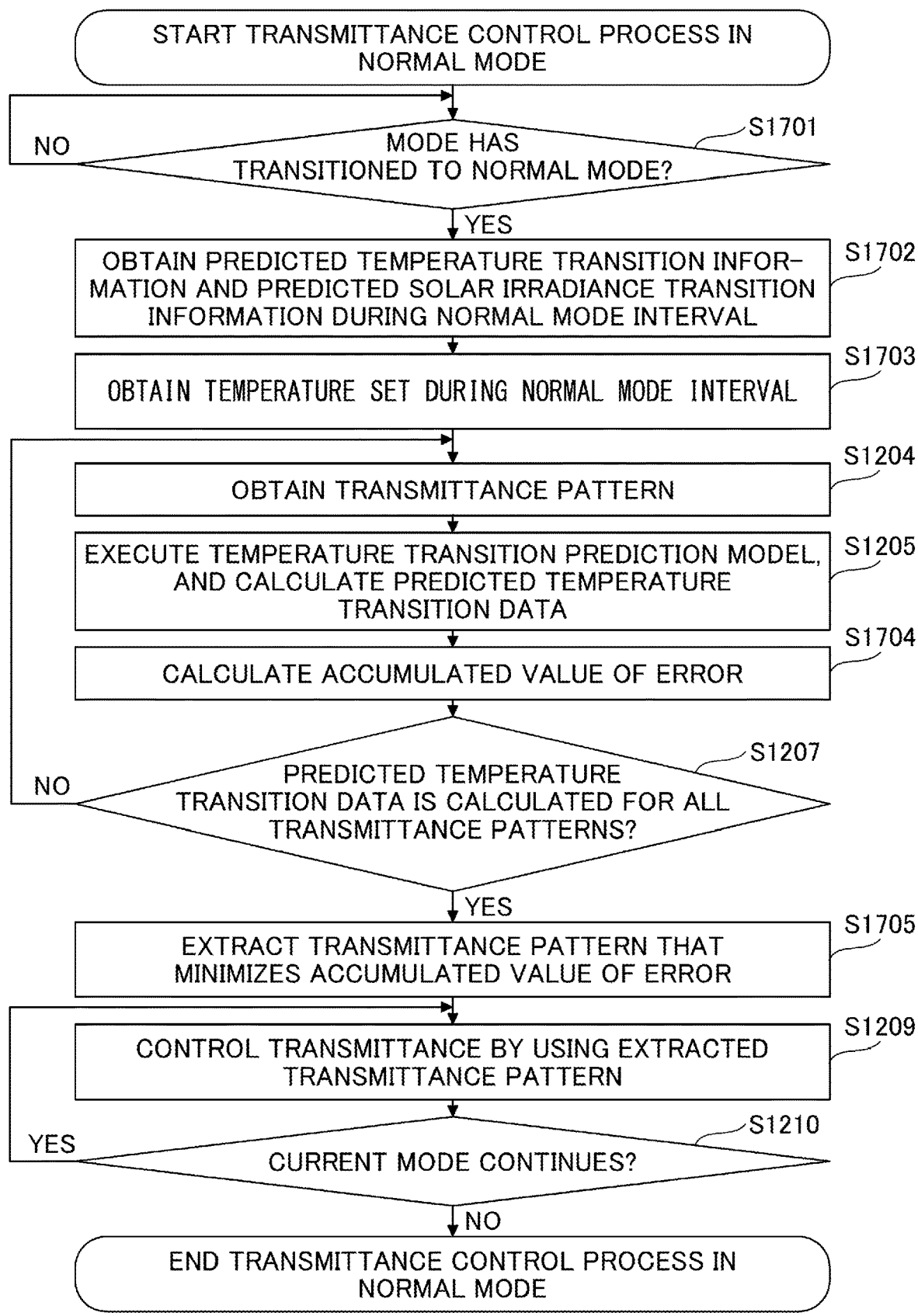
FIG. 17 is a first flowchart illustrating a flow of a transmittance control process in the normal mode interval.

Next, a flow of a transmittance control process in the normal mode will be described. FIG. 17 is a first flowchart illustrating the flow of the transmittance control process in the normal mode. The differences from the transmittance control process in the prediction mode illustrated in FIG. 12 are steps S1701 to S1703, S1704, and S1705.

In step S1701, the air conditioning system operation status obtaining unit 801 monitors the ON/OFF information notified by the air conditioning system 230_1, and the usage status obtaining unit 802 monitors the usage status of the space A notified by the building management system 210. Consequently, the control unit 340 determines whether to operate in the normal mode or in the prediction mode. With respect to this, the predicted temperature obtaining unit 803, the predicted solar irradiance obtaining unit 804, and the transmittance control unit 810 monitor the mode transition of the control unit 340 and determine whether the control unit 340 has transitioned from the prediction mode to the normal mode.

In step S1701, if it is determined that the control unit 340 does not transition from the prediction mode to the normal mode (NO in step S1701), the process waits until it is determined that the control unit 340 has transitioned from the prediction mode to the normal mode.

In step S1701, if it is determined that the control unit 340 has transitioned from the prediction mode to the normal mode (YES in step S1701), the process proceeds to step S1702.

In step S1702, the predicted temperature obtaining unit 803 obtains the predicted temperature transition information in the normal mode interval from the external network 250. The predicted solar irradiance obtaining unit 804 obtains the predicted temperature transition information in the normal mode interval from the external network 250.

In step S1703, the set temperature obtaining unit 807 obtains the indoor temperature set in the air conditioning system 230 as the indoor temperature set for the space A in the normal mode interval.

In step S1704, the determining unit 808 calculates an accumulated value of the error between the temperature in the normal mode interval in the predicted temperature transition data calculated by the model executing unit 806 and the set indoor temperature of the space A in the normal mode interval obtained by the set temperature obtaining unit 807.

In step S1705, the transmittance pattern extracting unit 809 extracts a transmittance pattern that minimizes the accumulated value of the error, and notifies the transmittance control unit 810 of the transmittance pattern.

<Summary>

As is obvious from the above description, the smart window control device according to the third embodiment is configured to:

control transmittance of a smart window provided as a window of a space where the temperature is controlled by an air conditioning system in accordance with the set indoor temperature obtain predicted temperature transition information and predicted solar irradiance transition information in a normal mode interval from an external network, the normal mode interval being an interval in which the air conditioning system is in operation generate a temperature transition prediction model that predicts temperature transition of the space over a predetermined time range, based on the outdoor temperature actually measured in the past, the outdoor solar irradiance actually measured in the past, and the actual transmittance in the past calculate multiple predicted temperature transition data in the normal mode interval by sequentially inputting multiple transmittance patterns into the generated temperature prediction model together with the predicted temperature transition information and the predicted solar irradiance transition information extract a transmittance pattern that minimizes an accumulated value of the difference between the temperature in the normal mode interval and the set indoor temperature in the normal mode interval, among multiple calculated predicted temperature transition data, and control the transmittance of the smart window in the normal mode interval by using the transmittance pattern.

As described above, in the smart window control device according to the third embodiment, the temperature of the space in the normal mode interval is transitioned based on the predicted temperature transition so that the temperature in the normal mode interval approaches the set indoor temperature in the normal mode interval. Consequently, according to the smart window control device according to the third embodiment, the influence of the time lag from the time when the transmittance is controlled to the time when the temperature in the building actually changes can be reduced.

As a result, according to the smart window control device according to the third embodiment, the load in the interval in which the air conditioning system is in operation can be minimized.

Fourth Embodiment

In the third embodiment described above, the indoor temperature set in the air conditioning system 230 is used as the indoor temperature set for the space A in the normal mode interval. However, as the indoor temperature set for the space A in the normal mode interval, the modified set indoor temperature may be used by modifying the indoor temperature set in the air conditioning system 230.

For example, if it is known in advance that a large number of people who may raise the temperature of the space A will enter at a predetermined date and time, the indoor temperature set at the predetermined date and time may be modified to be lower, and the transmittance of the smart window may be controlled.

That is, if it is known in advance that a change in internal environment information about the inside that may affect the temperature in the space occurs at a predetermined date and time, the indoor temperature set at the predetermined date and time is modified to consequently maintain the temperature of the indoor space A constant. This can reduce the load in the interval in which the air conditioning system is in operation regardless of the change in the internal environment information. In the following, a fourth embodiment will be described focusing on the difference from the first to third embodiments described above.

<Description of a Predicted Value of Environment Information>

First, a predicted value of environment information will be described. In the first to third embodiments described above, as the predicted value of the environment information affecting the temperature in the space A, the predicted temperature transition information and the predicted solar irradiance transition information are exemplified. However, the predicted value of the environment information affecting the temperature in the space A is not limited to the predicted value of such external environment information about the outside, but also includes a predicted value of internal environment information.

The predicted value of the internal environment information is a predicted value of an event in the space A that affects the temperature of the space A during the normal mode interval, such as an inflow of people into the space A, an inflow of outside air into the space A, and an outflow of inside air from the space A.

Figure 18:
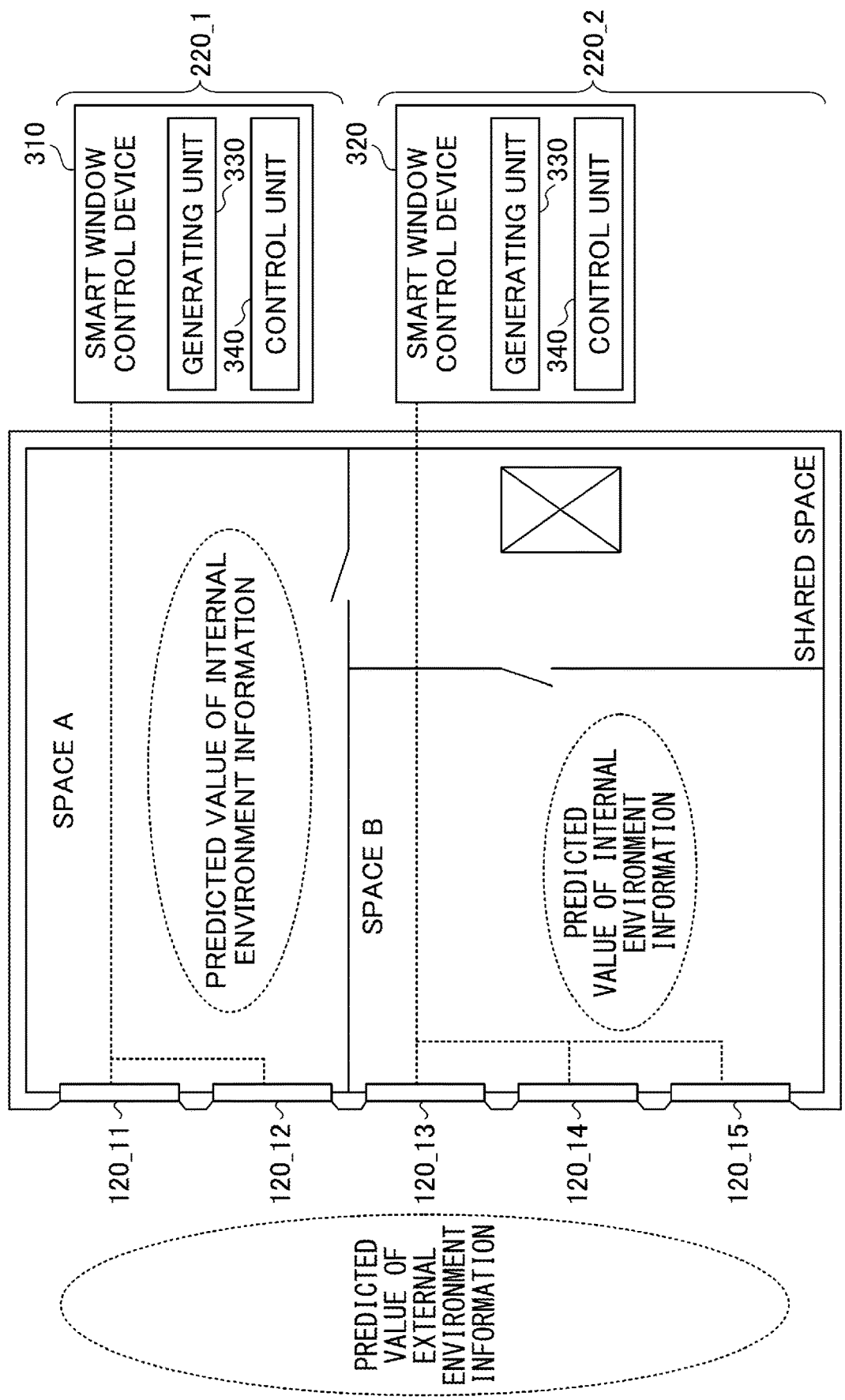
FIG. 18 is a drawing illustrating predicted values of the environment information.

FIG. 18 is a diagram illustrating the predicted values of the environment information. As illustrated in FIG. 18, in the fourth embodiment, the predicted values of the environment information according to the first to third embodiments (i.e., the predicted temperature transition information and the predicted solar irradiance transition information) correspond to the "predicted values of the external environment information".

With respect to the above, predicted values that predict events in the space A and the space B that affect the temperature of the space A and the space B during the normal mode interval are referred to as the predicted values of the internal environment information.

<Functional Configuration of the Smart Window Control Device>

Figure 19:
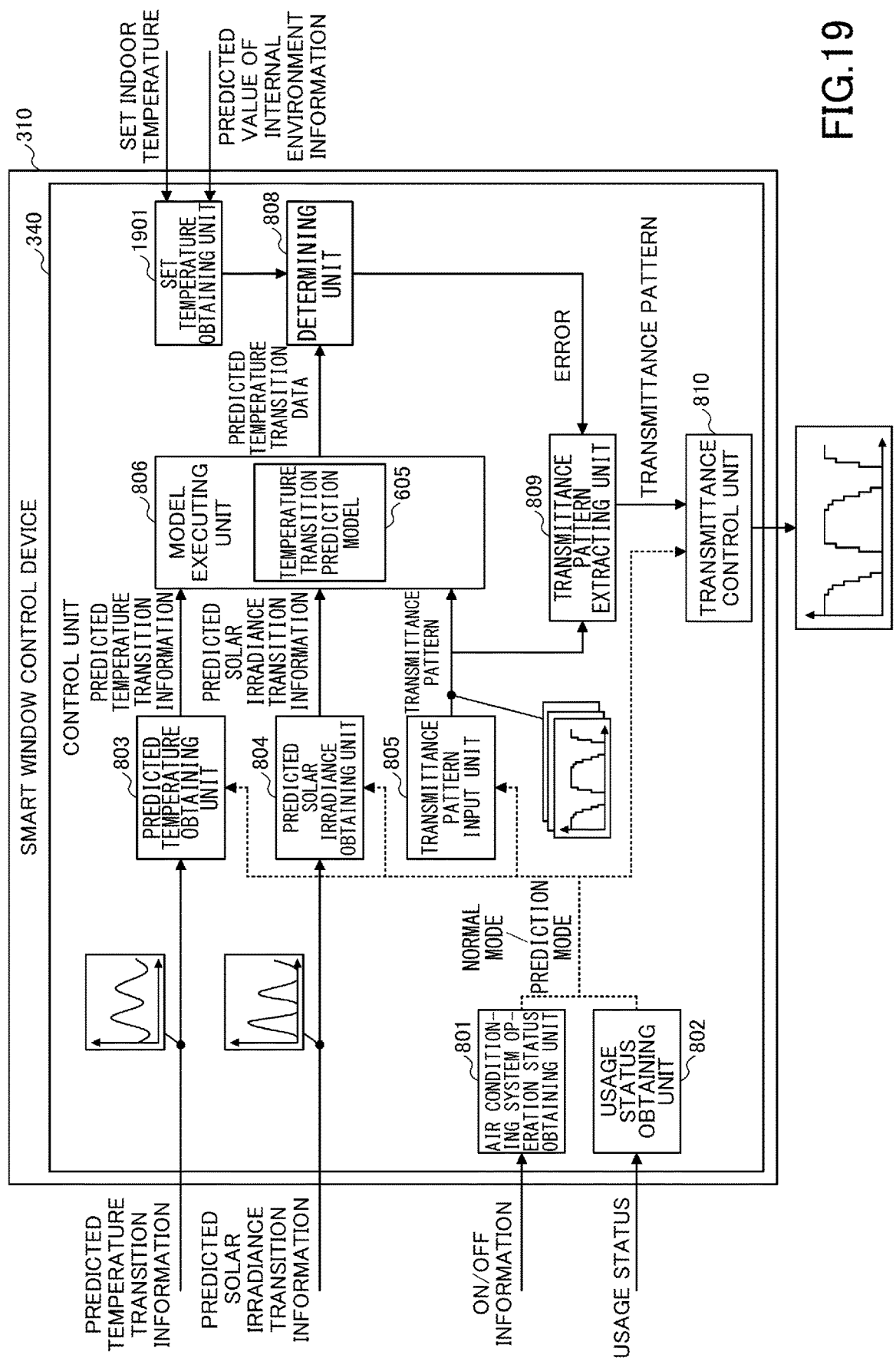
FIG. 19 is a third diagram illustrating an example of the functional configuration of the control unit of the smart window control device.

Next, a functional configuration of the smart window control device will be described. FIG. 19 is a second diagram illustrating an example of the functional configuration of the control unit of the smart window control device.

The difference from the functional configuration illustrated in FIG. 8 is that, in FIG. 19, a function of the set temperature obtaining unit 1901 differs from the function of the set temperature obtaining unit 807 illustrated in FIG. 8.

The set temperature obtaining unit 1901 is an example of a modifying unit. The set temperature obtaining unit 1901 obtains, from the air conditioning system 230_1, the indoor temperature set in the air conditioning system 230_1 as the set indoor temperature of the space A in the normal mode interval. Additionally, the set temperature obtaining unit 1901 obtains the predicted value of the internal environment information about the inside of the space A during the normal mode interval from the external network 250. Further, the set temperature obtaining unit 1901 modifies the obtained set indoor temperature based on the obtained predicted value of the internal environment information, and notifies the determining unit 808 of the modified set indoor temperature.

<Temperature Transition Prediction in the Normal Mode Interval>

Figure 20:
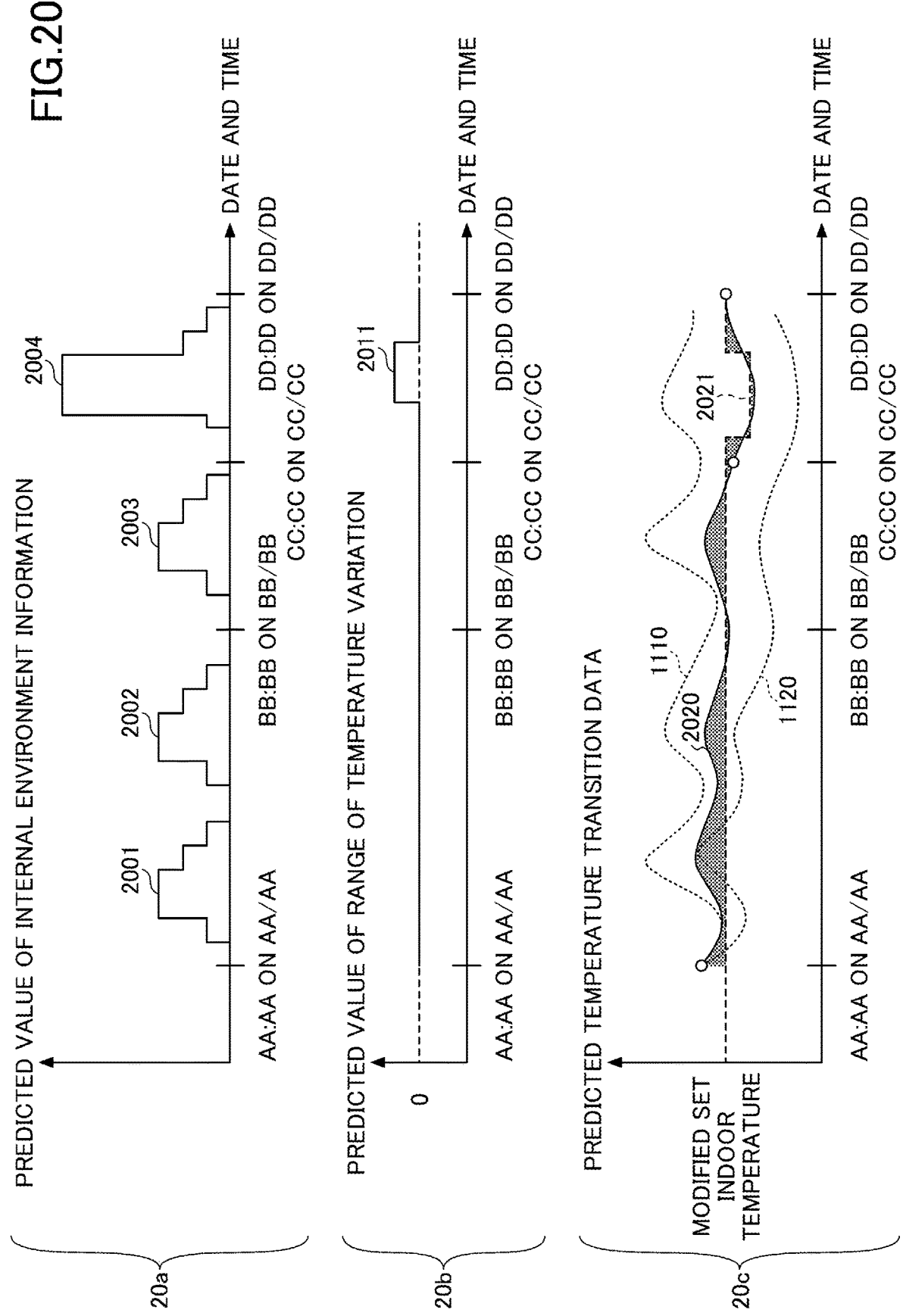
FIG. 20 is of second graphs illustrating an example of the predicted temperature transition data in the normal mode interval.

Next, a specific example of the predicted temperature transition data of the space A in the normal mode interval, that is calculated by the model executing unit 806 of the control unit 340 executing the learned temperature transition prediction model 605, will be described. FIG. 20 is of second graphs illustrating an example of the predicted temperature transition data in the normal mode interval.

Among the graphs, 20a of FIG. 20 is an example of the predicted value of the internal environment information in the normal mode interval. Here, the number of persons who flow into the space A during the normal mode interval is shown. As illustrated in the example of 20a of FIG. 20, it is predicted that the maximum number of persons entering the space A from "AA:AA [time] on AA/AA [date]" (first time) to "CC:CC [time] on CC/CC [date]" (second time), which is when a predetermined time period has elapsed after "AA:AA [time] on AA/AA [date]", is constant (see the reference numerals 2001 to 2003).

With respect to the above, the maximum number of persons entering the space A during a time period from "CC:CC [time] on CC/CC [date]" to "DD:DD [time] on DD/DD [date]" is predicted to change significantly (see the reference numeral 2004).

20b of FIG. 20 illustrates a predicted value of a range of the temperature variation of the space A caused by the change in the internal environment information in the normal mode interval. According to the example of 20b of FIG. 20, if the maximum value of the number of persons entering the space A is the value indicated by the reference numerals 2001 to 2003, it is predicted that the temperature variation of the space A caused by the inflow of persons will be zero or small.

With respect to the above, if the maximum value of the number of persons entering the space A is the value indicated by the reference numeral 2004, it is predicted that the temperature of the space A increases with the inflow of persons (see the reference numeral 2011).

20c of FIG. 20 illustrates an example of modified set indoor temperature in the normal mode interval and the predicted temperature transition data in the normal mode interval. As illustrated in 20c of FIG. 20, the predicted value of the range of the temperature variation of the space A that varies from "AA:AA [time] on AA/AA [date]" to "CC:CC [time] on CC/CC [date]" due to the change in the internal environment information is zero or small. Thus, the set temperature obtaining unit 1901 notifies the determining unit 808 of the indoor temperature set in the air conditioning system 230_1 as it is.

With respect to the above, it is predicted that the temperature of the space A increases due to the change in the internal environment information from "CC:CC [time] on CC/CC [date]" to "DD:DD [time] on DD/DD [date]". Therefore, the set temperature obtaining unit 1901 modifies the indoor temperature set in the air conditioning system 230_1 in accordance with the increase in the temperature, and notifies the determining unit 808 of the modified set indoor temperature (see the reference numeral 2021).

Additionally, in 20c of FIG. 20, the dotted line 1110 indicates the predicted temperature transition data of the space A in a case where a transmittance pattern that causes the temperature of the space A to transition at a highest temperature in response to the change in the external environment information is input. Further, the dotted line 1120 indicates the predicted temperature data of the space A in a case where a transmittance pattern that causes the temperature of the space A to transition at a lowest temperature in response to the change in the external environment information is input.

As described above, the temperature transition of the space A in the normal mode interval varies depending on the transmittance pattern used in the normal mode interval. The transmittance pattern extracting unit 809 of the control unit 340 extracts a transmittance pattern corresponding to the predicted temperature transition data (indicated by the solid line 2020) that minimizes an accumulated value of the difference from the modified set indoor temperature (for example, the area of the gray region of FIG. 20). If the accumulated value of the difference from the modified set indoor temperature is minimum, the load during the operation of the air conditioning system 230_1 can be minimized.

<Transmittance Control Process in the Normal Mode>

Figure 21:
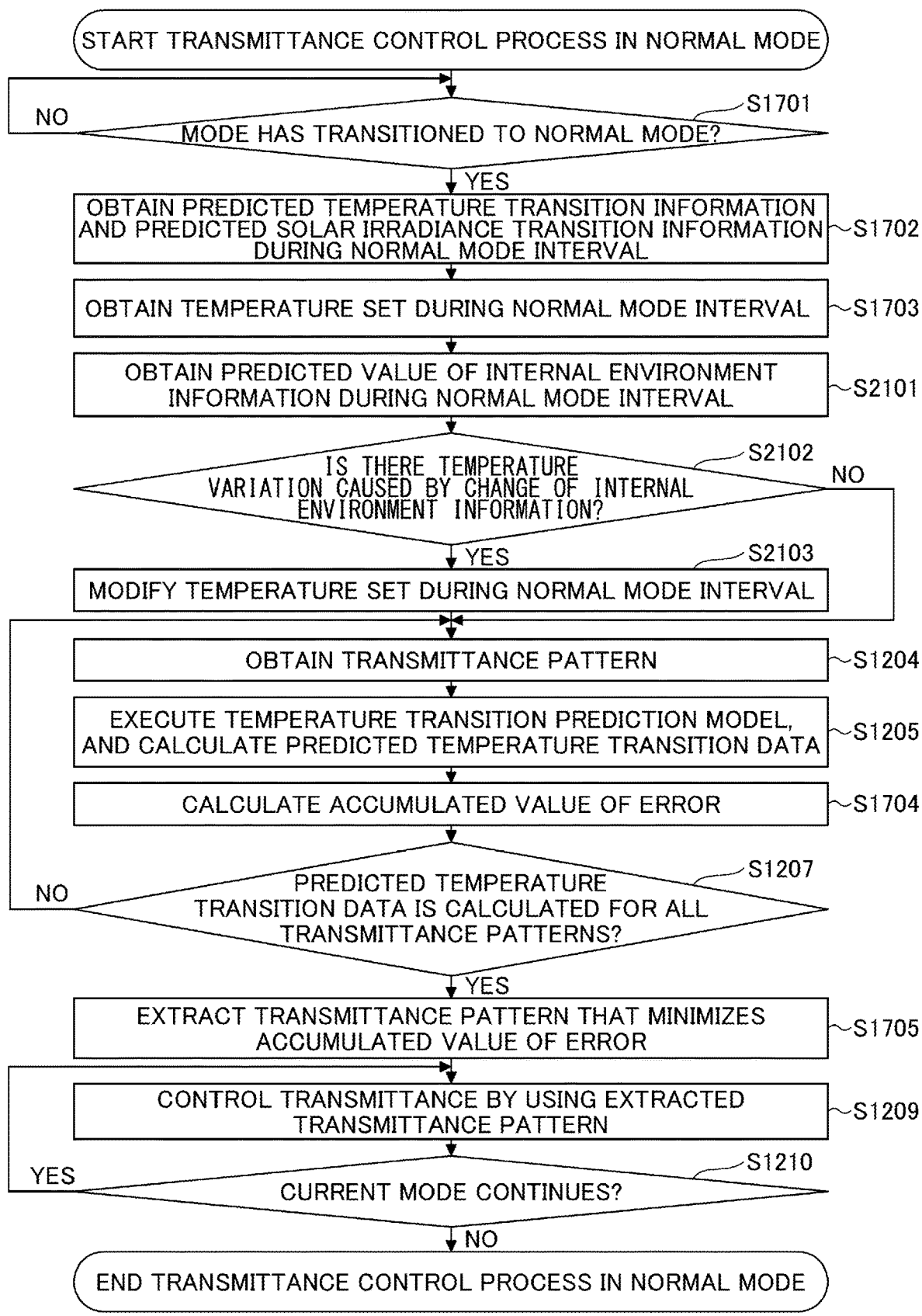
FIG. 21 is a second flowchart illustrating the flow of the transmittance control process in the normal mode interval.

Next, a flow of the transmittance control process in the normal mode will be described. FIG. 21 is a second flowchart illustrating the flow of the transmittance control process in the normal mode. The differences from the flowchart illustrated in FIG. 17 are steps S2101 to S2103.

In step S2101, the set temperature obtaining unit 1901 obtains the predicted value of the internal environment information about the inside of the space A during the normal mode interval from the external network 250.

In step S2102, the set temperature obtaining unit 1901 determines whether the temperature of the space A changes due to the change in the internal environment information in the normal mode interval. In step S2102, if it is determined that the temperature does not change (NO in step S2102), the set temperature obtaining unit 1901 notifies the determining unit 808 of the indoor temperature set in the air conditioning system 230_1 as it is and proceeds to step S1204.

With respect to the above, in step S2102, if it is determined that the temperature changes (YES in step S2102), the process proceeds to step S2103.

In step S2103, the set temperature obtaining unit 1901 modifies the indoor temperature set in the air conditioning system 230_1 in accordance with the range of the temperature variation of the space A that is changed due to the change of the internal environment information, and notifies the determining unit 808 of the modified set indoor temperature.

<Summary>

As is obvious from the above description, the smart window control device according to the fourth embodiment is configured to:

control the transmittance of a smart window provided as a window of a space where the temperature is controlled by an air conditioning system in accordance with the set room temperature obtain predicted temperature transition information and predicted solar irradiance transition information in a normal mode interval from an external network, the normal mode interval being an interval in which the air conditioning system is in operation generate a temperature transition prediction model that predicts temperature transition of the space over a predetermined time range, based on the outdoor temperature actually measured in the past, the outdoor solar irradiance actually measured in the past, and the actual transmittance in the past calculate multiple predicted temperature transition data in the normal mode interval by sequentially inputting multiple transmittance patterns into the generated temperature prediction model together with the predicted temperature transition information and the predicted solar irradiance transition information obtain a change in internal environment information from the external network in the normal mode interval and predict a range of a temperature variation of the space that is changed due to the change in the internal environment information, and further modify the set indoor temperature in the normal mode interval in accordance with the predicted range of the temperature variation extract a transmittance pattern that minimizes an accumulated value of a difference between the temperature in the normal mode interval and the modified set indoor temperature in the normal mode interval among the multiple calculated predicted temperature transition data, and further control the transmittance of the smart window in the normal mode interval by using the extracted transmittance pattern.

As described above, in the smart window control device according to the fourth embodiment, the temperature of the space in the normal mode interval transitions based on the predicted temperature transition so that the temperature in the normal mode interval approaches the modified set indoor temperature in the normal mode interval. Consequently, according to the smart window control device according to the fourth embodiment, the influence of of the time lag from when the transmittance is controlled to when the temperature actually changes in the building can be reduced.

As a result, according to the smart window control device according to the fourth embodiment, the load in the interval in which the air conditioning system is in operation can be minimized regardless of the change in the internal environment information.

OTHER EMBODIMENTS

In the first embodiment described above, the temperature transition prediction model 605 is described as a machine learning model, but the temperature transition prediction model 605 is not limited to a machine learning model. Any model representing a relationship between the actually measured outdoor temperature, the actually measured outdoor solar irradiance, and the actual transmittance; and the actually measured indoor temperature in a predetermined time range may be used.

In the first embodiment, it is described that predetermined transmittance patterns are previously prepared in the transmittance pattern input unit, and the transmittance pattern extracting unit extracts one transmittance pattern to be used in the transmittance control process from among the previously prepared transmittance patterns. However, a method of extracting the transmittance pattern to be used in the transmittance control process is not limited to this. For example, the transmittance pattern may be extracted by performing an inverse problem analysis based on the error calculated in the determining unit 808.

In the above-described first and second embodiments, it is described that the smart window control device controls multiple smart windows with the same transmittance. However, a method of controlling the smart window is not limited to this, and the smart window control device may be configured to control the smart window, for example, with different transmittance for each smart window.

In the above-described third and fourth embodiments, it is described that the transmittance pattern for multiple days in the normal mode interval is input to the learned temperature transition prediction model 605. Specifically, in the above-described third embodiment, "AA:AA [time] on AA/AA [date]" is defined as the first time, and "BB:BB [time] on BB/BB [date]" is defined as the second time. In the fourth embodiment, "AA:AA [time] on AA/AA [date]" is defined as the first time and "CC:CC [time] on CC/CC [date]" is defined as the second time, or "CC:CC [time] on CC/CC [date]" is defined as the first time, and the "DD:DD [time] on DD/DD [date]" is defined as the second time. Then, it is described that a transmittance pattern corresponding to the interval between the first time and the second time is input to the learned temperature transition prediction model 605.

However, the transmittance pattern is not limited to a transmittance pattern for multiple days, but may be a transmittance pattern for one day. Alternatively, the transmittance pattern may be a transmittance pattern for a predetermined amount of time.

It should be noted that the present invention is not limited to the above-described configurations, such as the configurations described in the above-described embodiments, and combinations with other elements. In these respects, modification can be made within the scope of the invention without departing from the spirit of the invention, and the configuration can be appropriately determined in accordance with the application form.

This application claims priority to Japanese Patent Application No. 2019-021863, filed Feb. 8, 2019, and Japanese Patent Application No. 2020-013263, filed Jan. 30, 2020, the entire contents of which are incorporated herein by reference.

LIST OF REFERENCE NUMERALS

120_11 to 120_15: smart window
200: network system
210: building management system
220: smart window control system
230: air conditioning system
310, 320: smart window control device
330: generating unit
340: control unit
410: air conditioning device
411_1, 411_2: indoor temperature sensor
412: outdoor solar irradiance sensor
413: indoor solar irradiance sensor
414: outdoor temperature sensor
601: actually measured outdoor temperature obtaining unit
602: actually measured outdoor solar irradiance obtaining unit
603: actual transmittance obtaining unit
604: model generating unit
605: temperature transition prediction model
606: model evaluating unit
607: actually measured indoor temperature obtaining unit
801: air conditioning system operation status obtaining unit
802: usage status obtaining unit
803: predicted temperature obtaining unit
804: predicted solar irradiance obtaining unit
805: transmittance pattern input unit
806: model executing unit
807: set temperature obtaining unit
808: determining unit
809: transmittance pattern extracting unit
810: transmittance control unit
1301: temperature transition pattern extracting unit
1302: actually measured indoor temperature obtaining unit
1303: transmittance control unit
1901: set temperature obtaining unit

The invention claimed is:

1. A smart window control device that controls transmittance of a smart window provided as a window of a space where a temperature is controlled by an air conditioning system in accordance with a set temperature, the smart window control device comprising:
a processor; and
a memory storing program instructions that cause the processor to:
obtain a predicted value of external environment information about outside of the space in an interval between a first time and a second time, the second time being when a predetermined time period has elapsed from the first time;
calculate a plurality of transition data of the temperature of the space in the interval based on the predicted value of the external environment information in the interval and a plurality of transmittance patterns, each of the plurality of transmittance patterns representing a transition pattern of the transmittance, wherein each of the plurality of transition data of the temperature of the space covers an entire length of the interval between the first time and the second time; and
control the transmittance of the smart window by selecting a transmittance pattern among the plurality of transmittance patterns so that a difference between the set temperature and a temperature obtained based on transition data calculated based on the selected transmittance pattern is minimized.

2. The smart window control device as claimed in claim 1,
wherein the processor obtains the predicted value of the external environment information in a stop interval between the first time when the air conditioning system stops and the second time when the air conditioning system restarts,
wherein the processor calculates a transition of the temperature of the space in the stop interval based on the predicted value of the external environment information in the stop interval, the transition of the temperature causing the temperature of the space at the second time when the air conditioning system restarts to approach the set temperature, and
wherein the processor controls the transmittance of the smart window so that the temperature of the space in the stop interval transitions based on the calculated transition of the temperature.

3. The smart window control device as claimed in claim 2, wherein the program instructions cause the processor to further generate a model representing a correspondence relation between an outdoor temperature, outdoor solar irradiance, and a result of controlling the transmittance of the smart window in a past predetermined time range; and an indoor temperature of the space in the past predetermined time range,
wherein the processor calculates the transition of the temperature of the space in the stop interval from the predicted value of the external environment information in the stop interval and a plurality of transmittance patterns in the stop interval, based on the correspondence relation.

4. The smart window control device as claimed in claim 3, wherein the processor generates the model by training the model so that an output approaches the indoor temperature in the past predetermined time range, the output being obtained in response to the outdoor temperature, the outdoor solar irradiance, and the result of controlling the transmittance of the smart window, in the past predetermined time range, being input into the model.

5. The smart window control device as claimed in claim 2, wherein the predicted value of the external environment information in the stop interval includes a predicted value of transition of an outdoor temperature in the stop interval and a predicted value of indoor solar irradiance in the stop interval.

6. The smart window control device as claimed in claim 3, wherein the program instructions cause the processor to further extract a transmittance pattern that minimizes error between the temperature of the space at the second time when the air conditioning system restarts and the set temperature, in the transition of the temperature of the space in the stop interval, the transition of the temperature being calculated for each of the plurality of transmittance patterns,
wherein the processor controls the transmittance of the smart window in the stop interval, based on the extracted transmittance pattern.

7. The smart window control device as claimed in claim 3, wherein the program instructions cause the processor to further extract a temperature transition pattern that minimizes error between the temperature of the space at the second time when the air conditioning system restarts and the set temperature, in the transition of the temperature of the space in the stop interval, the transition of the temperature being calculated for each of the plurality of transmittance patterns,
wherein the processor controls the transmittance of the smart window in the stop interval, based on the extracted temperature transition pattern.

8. The smart window control device as claimed in claim 2, wherein the stop interval is determined by obtaining information indicating that the air conditioning system stops and a predetermined time when the air conditioning system restarts next.

9. The smart window control device as claimed in claim 1,
wherein the processor obtains the predicted value of the external environment information in an operating interval in which the air conditioning system is in operation,
wherein the processor calculates a transition of the temperature of the space in the operating interval based on the predicted value of the external environment information in the operating interval, the transition of the temperature causing the temperature of the space in the operating interval in which the air conditioning system is in operation to approach the set temperature, and
wherein the processor controls the transmittance of the smart window so that the temperature of the space in the operating interval transitions based on the calculated transition of the temperature.

10. The smart window control device as claimed in claim 9, wherein the program instructions cause the processor to further modify the set temperature of the space in the operating interval by obtaining a predicted value of internal environment information about inside of the space in the operating interval in which the air conditioning system is in operation.

11. The smart window control device as claimed in claim 10, wherein the processor calculates the transition of the temperature of the space in the operating interval based on the predicted value of the external environment information in the operating interval, the transition of the temperature causing the temperature of the space in the operating interval in which the air conditioning system is in operation to approach the modified set temperature.

12. A smart window control method that controls transmittance of a smart window provided as a window of a space where a temperature is controlled by an air conditioning system in accordance with a set temperature, the smart window control method comprising:
obtaining a predicted value of external environment information about outside of the space in an interval between a first time and a second time, the second time being when a predetermined time period has elapsed from the first time;
calculating a plurality of transition data of the temperature of the space in the interval based on the predicted value of the external environment information in the interval and a plurality of transmittance patterns, each of the plurality of transmittance patterns representing a transition pattern of the transmittance, wherein each of the plurality of transition data of the temperature of the space covers an entire length of the interval between the first time and the second time; and
controlling the transmittance of the smart window by selecting a transmittance pattern among the plurality of transmittance patterns so that a difference between the set temperature and a temperature obtained based on transition data calculated based on the selected transmittance pattern is minimized.

13. A non-transitory computer-readable recording medium having stored therein a program for causing a computer of a smart window control device that controls transmittance of a smart window provided as a window of a space where a temperature is controlled by an air conditioning system in accordance with a set temperature to perform:
obtaining a predicted value of external environment information about outside of the space in an interval between a first time and a second time, the second time being when a predetermined time period has elapsed from the first time;
calculating a plurality of transition data of the temperature of the space in the interval based on the predicted value of the external environment information in the interval and a plurality of transmittance patterns, each of the plurality of transmittance patterns representing a transition pattern of the transmittance, wherein each of the plurality of transition data of the temperature of the space covers an entire length of the interval between the first time and the second time; and
controlling the transmittance of the smart window by selecting a transmittance pattern among the plurality of transmittance patterns so that a difference between the set temperature and a temperature obtained based on transition data calculated based on the selected transmittance pattern is minimized.

* * * * *